United States Patent
Ashton-Patton et al.

(10) Patent No.: US 11,186,516 B2
(45) Date of Patent: Nov. 30, 2021

(54) SUBSTRATES FOR USE IN FLUORESCENT-DETECTION METHODS HAVING GLASS SUBSTRATE PORTION

(71) Applicant: Corning Incorporated, Corning, NY (US)

(72) Inventors: Melissann Marie Ashton-Patton, Corning, NY (US); Adam James Ellison, Corning, NY (US); Ellen Anne King, Savona, NY (US); Joydeep Lahiri, Corning, NY (US); Shawn Michael O'Malley, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 15/769,212

(22) PCT Filed: Oct. 21, 2016

(86) PCT No.: PCT/US2016/058168
§ 371 (c)(1),
(2) Date: Apr. 18, 2018

(87) PCT Pub. No.: WO2017/070500
PCT Pub. Date: Apr. 27, 2017

(65) Prior Publication Data
US 2018/0305240 A1    Oct. 25, 2018

Related U.S. Application Data

(60) Provisional application No. 62/362,331, filed on Jul. 14, 2016, provisional application No. 62/245,006, filed on Oct. 22, 2015.

(51) Int. Cl.
| | |
|---|---|
| C03C 3/085 | (2006.01) |
| C03C 3/093 | (2006.01) |
| C03C 21/00 | (2006.01) |
| C03C 3/091 | (2006.01) |
| F21V 8/00 | (2006.01) |
| C03C 3/087 | (2006.01) |
| C03C 3/078 | (2006.01) |
| C03C 3/095 | (2006.01) |
| C03C 4/12 | (2006.01) |

(52) U.S. Cl.
CPC .............. *C03C 3/093* (2013.01); *C03C 3/078* (2013.01); *C03C 3/087* (2013.01); *C03C 3/091* (2013.01); *C03C 3/095* (2013.01); *C03C 4/12* (2013.01); *C03C 21/002* (2013.01); *G02B 6/0065* (2013.01); *G02B 6/005* (2013.01)

(58) Field of Classification Search
CPC ......... C03C 3/087; C03C 3/093; C03C 3/095; C03C 3/078; C03C 4/12; G02B 6/0065; G02B 6/005
See application file for complete search history.

(56) References Cited

U.S. PATENT DOCUMENTS

| | | | |
|---|---|---|---|
| 5,015,909 A | * | 5/1991 | Zhong .................... C03C 3/068 313/105 R |
| 5,264,722 A | * | 11/1993 | Tonucci ................. B82Y 10/00 250/207 |
| 6,440,531 B1 | | 8/2002 | Kurachi et al. |
| 6,461,734 B1 | | 10/2002 | Carre |
| 7,538,050 B2 | | 5/2009 | Takagi et al. |
| 7,687,420 B2 | | 3/2010 | Murata |
| 7,838,452 B2 | | 11/2010 | Kurachi et al. |
| 8,168,295 B2 | | 5/2012 | Murata |
| 8,357,459 B2 | | 1/2013 | Tachiwana et al. |
| 8,418,545 B2 | | 4/2013 | Sezeur et al. |
| 8,518,545 B2 | | 8/2013 | Akiba et al. |
| 8,652,979 B2 | | 2/2014 | Murata |
| 9,139,469 B2 | | 9/2015 | Comte et al. |
| 9,701,576 B2 | | 7/2017 | Bockmeyer et al. |
| 9,963,378 B2 | | 5/2018 | Yamamoto |
| 2002/0015952 A1 | * | 2/2002 | Anderson ............ B01J 19/0046 435/6.11 |

(Continued)

FOREIGN PATENT DOCUMENTS

| | | |
|---|---|---|
| CN | 1492844 A | 4/2004 |
| CN | 1766612 A | 5/2006 |

(Continued)

OTHER PUBLICATIONS

Piruska, A., et al., "The Autofluorescence of Plastic Materials and Chips Measured Under Laser Irradiation." Lab Chip, vol. 5, pp. 1348-1354, Nov. 1, 2005.
International Search Report and Written Opinion of the International Searching Authority; PCT/US2016/058168; dated Jan. 4, 2017; 11 Pages; European Patent Office.
First Office Action received for CN App. No. 201680061998.3, dated Aug. 3, 2020, 22 pages (12 pages of English Translation and 10 pages of Original Document).
Office Action received for JP App. No. 2018-520525, dated Sep. 3, 2020, 12 pages (6 pages of English Translation and 6 pages of Original Document).

(Continued)

*Primary Examiner* — Elizabeth A. Bolden
(74) *Attorney, Agent, or Firm* — Annie J. Morgan

(57) ABSTRACT

A substrate for use in fluorescent-detection methods is provided. The substrate includes at least one glass substrate portion, the at least one glass substrate portion including: between about 60 mol % to about 80 mol % $SiO_2$; between about 0 mol % to about 15 mol % $Al_2O_3$; between about 0 mol % to about 15 mol % $B_2O_3$; and about 2 mol % to about 50 mol % $R_xO$, wherein R is any one or more of Li, Na, K, Rb, Cs and x is 2, or wherein R is any one or more of Zn, Mg, Ca, Sr or Ba and x is 1.

22 Claims, 4 Drawing Sheets

(56) References Cited

U.S. PATENT DOCUMENTS

| | | |
|---|---|---|
| 2002/0022219 A1* | 2/2002 | Clements .............. B01L 3/5085 435/4 |
| 2002/0042068 A1 | 4/2002 | Mizuno et al. |
| 2002/0198094 A1 | 12/2002 | Arbab et al. |
| 2003/0172682 A1 | 9/2003 | Sato et al. |
| 2003/0216242 A1 | 11/2003 | Arbab et al. |
| 2005/0048571 A1 | 3/2005 | Danielson et al. |
| 2005/0064209 A1 | 3/2005 | Haines et al. |
| 2005/0170498 A1 | 8/2005 | Dolley et al. |
| 2007/0154356 A1* | 7/2007 | Modavis ............... B01L 3/5085 422/400 |
| 2009/0023575 A1 | 1/2009 | Fujita et al. |
| 2009/0075805 A1 | 3/2009 | Kurachi et al. |
| 2011/0014475 A1 | 1/2011 | Murata |
| 2011/0017297 A1 | 1/2011 | Aitken et al. |
| 2011/0291436 A1 | 12/2011 | Shelestak et al. |
| 2012/0297829 A1 | 11/2012 | Endo et al. |
| 2013/0274085 A1* | 10/2013 | Beall ..................... C03C 14/006 501/32 |
| 2014/0023865 A1* | 1/2014 | Comte ................... C03C 21/002 428/410 |
| 2014/0113141 A1 | 4/2014 | Yamamoto et al. |
| 2015/0050476 A1 | 2/2015 | Zheng et al. |
| 2015/0064474 A1 | 3/2015 | Dejneka et al. |
| 2015/0140299 A1 | 5/2015 | Ellison et al. |
| 2015/0152003 A1 | 6/2015 | Kawamoto et al. |
| 2015/0166401 A1 | 6/2015 | Yamamoto |
| 2015/0368146 A1 | 12/2015 | Ellison et al. |
| 2016/0137547 A1 | 5/2016 | Theocharopoulos et al. |
| 2016/0238778 A1 | 8/2016 | Hijiya et al. |

FOREIGN PATENT DOCUMENTS

| | | | |
|---|---|---|---|
| CN | 103755153 A | 4/2014 | |
| CN | 104230165 A | 12/2014 | |
| CN | 104556685 A | 4/2015 | |
| CN | 106573820 A | 4/2017 | |
| DE | 10025465 C2 | 3/2003 | |
| EP | 594134 B1 | 1/1999 | |
| JP | 2003-526078 A | 9/2003 | |
| JP | 2007-526767 A | 9/2007 | |
| JP | 2008115071 A | 5/2008 | |
| JP | 2013-500229 A | 1/2013 | |
| JP | 2013-502370 A | 1/2013 | |
| TW | 200922899 A | 6/2009 | |
| TW | 201118054 A | 6/2011 | |
| WO | 2011/011667 A1 | 1/2011 | |
| WO | 2011/022639 A2 | 2/2011 | |
| WO | 2011144024 A1 | 11/2011 | |
| WO | WO-2013130665 A2 * | 9/2013 | ........... C03C 21/002 |
| WO | 2015/015913 A1 | 2/2015 | |
| WO | 2015/068741 A1 | 5/2015 | |
| WO | 2015127583 A1 | 9/2015 | |

OTHER PUBLICATIONS

European Patent Application No. 16794468.5, Office Action dated Apr. 23, 2021; 4 pages; European Patent Office.

* cited by examiner

SUBSTRATES FOR USE IN FLUORESCENT-DETECTION METHODS HAVING GLASS SUBSTRATE PORTION

CROSS-REFERENCE TO RELATED APPLICATIONS

This is a national stage application under 35 U.S.C. § 371 of International Application No. PCT/US2016/058168, filed on Oct. 21, 2016, which claims the benefit of priority of U.S. Provisional Application Ser. No. 62/245,006 filed on Oct. 22, 2015 and U.S. Provisional Application Ser. No. 62/362,331 filed on Jul. 14, 2016 the contents of which are relied upon and incorporated herein by reference in their entirety.

FIELD

The present disclosure relates generally to substrates for use in fluorescent-detection methods, and, more particularly, to substrates for use in fluorescent-detection methods having at least one glass substrate portion.

BACKGROUND

Various protocols in biological or chemical research involve performing a large number of controlled reactions on local support surfaces or within predefined reaction chambers. The desired reactions may then be observed or detected and subsequent analysis may help identify or reveal properties of chemicals involved in the reaction. For example, in some multiplex assays, an unknown analyte having an identifiable label (e.g., fluorescent label) may be exposed to thousands of known probes under controlled conditions. Each known probe may be deposited on a microarray or into a corresponding well of a microplate. Observing any chemical reactions that occur between the known probes and the unknown analyte may help identify or reveal properties of the analyte. Other examples of such protocols include known DNA sequencing processes, such as sequencing-by-synthesis (SBS) or cyclic-array sequencing.

In some conventional fluorescent-detection protocols, an optical system is used to direct an excitation light onto fluorescently-labeled analytes and to also detect the fluorescent signals that may emit from the analytes. Because fluorescent-detection methods can safely and inexpensively perform measurements of biomolecules by combining existing optical components without using a radioisotope, the methods have been applied to various kinds of biomolecule detection protocols such as, for example, enzyme immunoassay, electrophoresis, and confocal scanning fluorescence microscopy.

Generally, when performing a fluorescent-detection method, a substrate, a cell, a channel or the like for holding a sample is used (hereinafter referred to as "substrate"). Silica such as fused silica, which has a high transparency to ultraviolet light, has conventionally been adopted as the material of choice for such substrates. But optical quality silica is a relatively expensive material and more inexpensive alternatives have been sought. Certain plastics and high-polymer materials have been proposed to replace more expensive materials such as silica. While such plastic and polymer materials are easily moldable and characterized as being disposable after use, plastic and polymer materials are also known to emit auto-fluorescence when irradiated with excitation light. The term "auto-fluorescence" as used herein describes the natural or inherent fluorescence produced by substrates for use in fluorescent-detection methods. Auto-fluorescence emitted from a substrate causes background noise which can be detrimental to the overall signal-to-noise ratio of the fluorescent-detection method and which can prevent a user from accurately determining a base-line level of fluorescence.

SUMMARY

According to an embodiment of the present disclosure, a substrate for use in fluorescent-detection methods is provided. The substrate includes at least one glass substrate portion, the at least one glass substrate portion including: between about 60 mol % to about 80 mol % $SiO_2$; between about 0 mol % to about 15 mol % $Al_2O_3$; between about 0 mol % to about 15 mol % $B_2O_3$; and about 2 mol % to about 50 mol % $R_xO$, wherein R is any one or more of Li, Na, K, Rb, Cs and x is 2, or wherein R is any one or more of Zn, Mg, Ca, Sr or Ba and x is 1.

Additional features and advantages of the disclosure will be set forth in the detailed description which follows, and in part will be readily apparent to those skilled in the art from that description or recognized by practicing the methods as described herein, including the detailed description which follows, the claims, as well as the appended drawings.

It is to be understood that both the foregoing general description and the following detailed description present various embodiments of the disclosure, and are intended to provide an overview or framework for understanding the nature and character of the claims. The accompanying drawings are included to provide a further understanding of the disclosure, and are incorporated into and constitute a part of this specification. The drawings illustrate various embodiments of the disclosure and together with the description serve to explain the principles and operations of the disclosure.

BRIEF DESCRIPTION OF THE DRAWINGS

The following detailed description can be further understood when read in conjunction with the following drawings.

DETAILED DESCRIPTION

Figure 1:
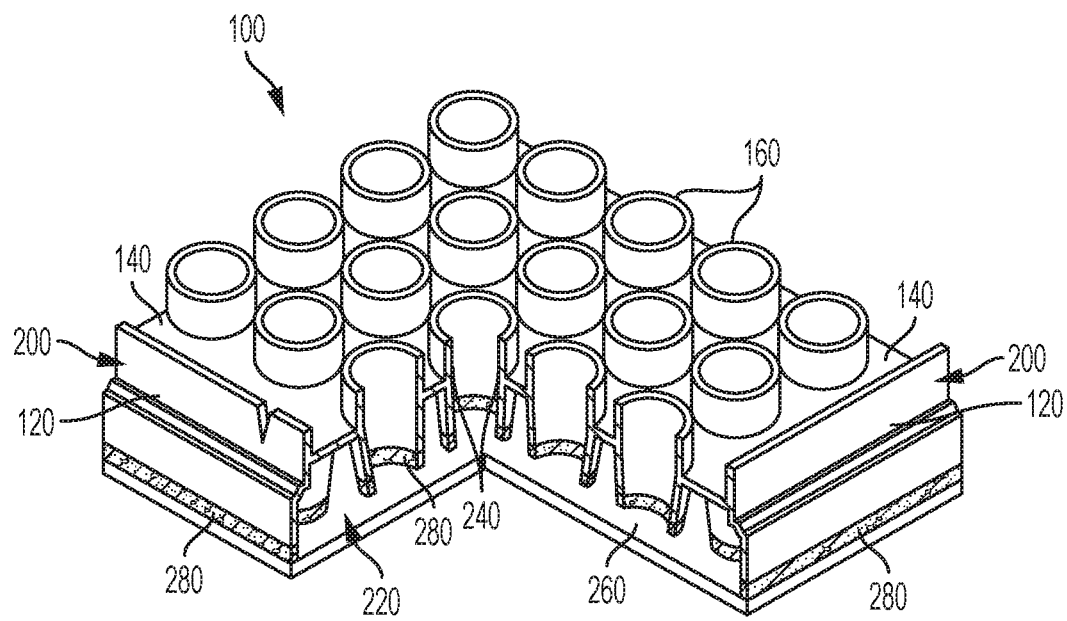
FIG. 1 is a cross sectional view of a multiwell plate in accordance with embodiments of the present disclosure.

Embodiments of the present disclosure relate to substrates for use in fluorescent-detection methods, and, more particularly, to substrates for use in fluorescent-detection methods having at least one glass substrate portion. The substrates as described herein may be any substrate suitable for use in fluorescent-detection methods. In particular, embodiments of the present disclosure relate to substrates which find application in the fields of microbiology, cell culturing, tissue culturing, cell assays, IVF and DNA sequencing. While specific embodiments are described herein with reference to FIGS. 1-5, the substrate may be, for example, but without limitation, a microscope slide, a microarray, a flask, a capillary tube, a multiwell plate, a microfluidic channel, a microfluidic reservoir, a dish such as a petri dish, etc. Regardless of the specific fluorescent-detection method applied, the at least one glass substrate portion of the substrates as described herein exhibits high transmittance of excitation light directed onto analytes and/or high transmittance of fluorescent signals that may emit from the analytes. As understood in view of the relationship between transmittance and absorbance, the at least one glass substrate portion of the substrates as described herein also exhibits low absorbance of excitation light directed onto analytes and/or low absorbance of fluorescent signals that may emit from the analytes. Additionally, substrates described herein include at least one glass substrate portion having low auto-fluorescence.

In various embodiments, the glass composition of the glass of the substrate may comprise between 60-80 mol % $SiO_2$, between 0-20 mol % $Al_2O_3$, and between 0-15 mol % $B_2O_3$, and less than 50 ppm iron (Fe) concentration. In some embodiments, there may be less than 25 ppm Fe, or in some embodiments the Fe concentration may be about 20 ppm or less. In additional embodiments, the glass may be formed by a polished float glass, a fusion draw process, a slot draw process, a redraw process, or another suitable forming process.

In other embodiments, the glass composition of the glass of the substrate may comprise between 63-81 mol % $SiO_2$, between 0-5 mol % $Al_2O_3$, between 0-6 mol % MgO, between 7-14 mol % CaO, between 0-2 mol % $Li_2O$, between 9-15 mol % $Na_2O$, between 0-1.5 mol % $K_2O$, and trace amounts of $Fe_2O_3$, $Cr_2O_3$, $MnO_2$, $Co_3O_4$, $TiO_2$, $SO_3$, and/or Se.

According to one or more embodiments, the glass may comprise colorless oxide components selected from the glass formers $SiO_2$, $Al_2O_3$, and $B_2O_3$. The exemplary glass may also include fluxes to obtain favorable melting and forming attributes. Such fluxes include alkali oxides ($Li_2O$, $Na_2O$, $K_2O$, $Rb_2O$ and $Cs_2O$) and alkaline earth oxides (MgO, CaO, SrO, ZnO and BaO). In one embodiment, the glass contains constituents in the range of 60-80 mol % $SiO_2$, in the range of 0-20 mol % $Al_2O_3$, in the range of 0-15 mol % $B_2O_3$, and in the range of 5 and 20% alkali oxides, alkaline earth oxides, or combinations thereof. In other embodiments, the glass composition may comprise no $B_2O_3$ and comprise between 63-81 mol % $SiO_2$, between 0-5 mol % $Al_2O_3$, between 0-6 mol % MgO, between 7-14 mol % CaO, between 0-2 mol % $Li_2O$, between 9-15 mol % $Na_2O$, between 0-1.5 mol % $K_2O$, and trace amounts of $Fe_2O_3$, $Cr_2O_3$, $MnO_2$, $Co_3O_4$, $TiO_2$, $SO_3$, and/or Se In some glass compositions described herein, $SiO_2$ can serve as the basic glass former. In certain embodiments, the concentration of $SiO_2$ can be greater than 60 mole percent to provide the glass with a density and chemical durability suitable for intended applications of the substrates as described herein, and a liquidus temperature (liquidus viscosity), which allows the glass to be formed by a downdraw process (e.g., a fusion process). In terms of an upper limit, in general, the $SiO_2$ concentration can be less than or equal to about 80 mole percent to allow batch materials to be melted using conventional, high volume, melting techniques, e.g., Joule melting in a refractory melter. As the concentration of $SiO_2$ increases, the 200 poise temperature (melting temperature) generally rises. In various applications, the $SiO_2$ concentration is adjusted so that the glass composition has a melting temperature less than or equal to 1,750° C. In various embodiments, the mol % of $SiO_2$ may be in the range of about 60% to about 81%, or alternatively in the range of about 66% to about 78%, or in the range of about 72% to about 80%, or in the range of about 65% to about 79%, and all subranges therebetween. In additional embodiments, the mol % of $SiO_2$ may be between about 70% to about 74%, or between about 74% to about 78%. In some embodiments, the mol % of $SiO_2$ may be about 72% to 73%. In other embodiments, the mol % of $SiO_2$ may be about 76% to 77%.

$Al_2O_3$ is another glass former used to make the glasses described herein. Higher mole percent $Al_2O_3$ can improve the glass' annealing point and modulus. In various embodiments, the mol % of $Al_2O_3$ may be in the range of about 0% to about 20%, or alternatively in the range of about 4% to about 11%, or in the range of about 6% to about 8%, or in the range of about 3% to about 7%, and all subranges therebetween. In additional embodiments, the mol % of $Al_2O_3$ may be between about 4% to about 10%, or between about 5% to about 8%. In some embodiments, the mol % of $Al_2O_3$ may be about 7% to 8%. In other embodiments, the mol % of $Al_2O_3$ may be about 5% to 6%, or from 0% to about 5% or from 0% to about 2%.

$B_2O_3$ is both a glass former and a flux that aids melting and lowers the melting temperature. It has an impact on both liquidus temperature and viscosity. Increasing $B_2O_3$ can be used to increase the liquidus viscosity of a glass. To achieve these effects, the glass compositions of one or more embodiments may have $B_2O_3$ concentrations that are equal to or greater than 0.1 mole percent; however, some compositions may have a negligible amount of $B_2O_3$. As discussed above with regard to $SiO_2$, glass durability is very important for the intended applications of the substrates as described herein. Durability can be controlled somewhat by elevated concentrations of alkaline earth oxides, and significantly reduced by elevated $B_2O_3$ content. Annealing point decreases as $B_2O_3$ increases, so it may be helpful to keep $B_2O_3$ content low. Thus, in various embodiments, the mol % of $B_2O_3$ may be in the range of about 0% to about 15%, or alternatively in the range of about 0% to about 12%, or in the range of about 0% to about 11%, in the range of about 3% to about 7%, or in the range of about 0% to about 2%, and all subranges therebetween. In some embodiments, the mol % of $B_2O_3$ may be about 7% to 8%. In other embodiments, the mol % of $B_2O_3$ may be negligible or about 0% to 1%.

In addition to the glass formers ($SiO_2$, $Al_2O_3$, and $B_2O_3$), the glasses described herein also include alkaline earth oxides. In one embodiment, at least three alkaline earth oxides are part of the glass composition, e.g., MgO, CaO, and BaO, and, optionally, SrO. The alkaline earth oxides provide the glass with various properties important to melting, fining, forming, and ultimate use. Accordingly, to improve glass performance in these regards, in one embodiment, the (MgO+CaO+SrO+BaO)/$Al_2O_3$ ratio is between 0 and 2.0. As this ratio increases, viscosity tends to increase more strongly than liquidus temperature, and thus it is increasingly difficult to obtain suitably high values for $T_{35k}$–$T_{liq}$. Thus in another embodiment, ratio (MgO+CaO+SrO+BaO)/$Al_2O_3$ is less than or equal to about 2. In some embodiments, the (MgO+CaO+SrO+BaO)/$Al_2O_3$ ratio is in the range of about 0 to about 1.0, or in the range of about 0.2 to about 0.6, or in the range of about 0.4 to about 0.6. In detailed embodiments, the (MgO+CaO+SrO+BaO)/$Al_2O_3$ ratio is less than about 0.55 or less than about 0.4.

For certain embodiments of this disclosure, the alkaline earth oxides may be treated as what is in effect a single compositional component. This is because their impact upon viscoelastic properties, liquidus temperatures and liquidus phase relationships are qualitatively more similar to one another than they are to the glass forming oxides $SiO_2$, $Al_2O_3$ and $B_2O_3$. However, the alkaline earth oxides CaO, SrO and BaO can form feldspar minerals, notably anorthite ($CaAl_2Si_2O_8$) and celsian ($BaAl_2Si_2O_8$) and strontium-bearing solid solutions of same, but MgO does not participate in these crystals to a significant degree. Therefore, when a feldspar crystal is already in the liquidus phase, a superaddition of MgO may serves to stabilize the liquid relative to the crystal and thus lower the liquidus temperature. At the same time, the viscosity curve typically becomes steeper, reducing melting temperatures while having little or no impact on low-temperature viscosities.

The inventors have found that the addition of small amounts of MgO may benefit melting by reducing melting temperatures, forming by reducing liquidus temperatures and increasing liquidus viscosity, while preserving high annealing points. In various embodiments, the glass composition comprises MgO in an amount in the range of about 0 mol % to about 10 mol %, or in the range of about 0 mol % to about 6 mol %, or in the range of about 1.0 mol % to about 8.0 mol %, or in the range of about 0 mol % to about 8.72 mol %, or in the range of about 1.0 mol % to about 7.0 mol %, or in the range of about 0 mol % to about 5 mol %, or in the range of about 1 mol % to about 3 mol %, or in the range of about 2 mol % to about 10 mol %, or in the range of about 4 mol % to about 8 mol %, and all subranges therebetween.

Without being bound by any particular theory of operation, it is believed that calcium oxide (CaO) present in the glass composition can produce low liquidus temperatures (high liquidus viscosities), high annealing points and moduli, and CTE's in the most desired ranges for intended applications of the substrates as described herein. It also contributes favorably to chemical durability, and compared to other alkaline earth oxides, it is relatively inexpensive as a batch material. However, at high concentrations, CaO increases the density and CTE. Furthermore, at sufficiently low $SiO_2$ concentrations, CaO may stabilize anorthite, thus decreasing liquidus viscosity. Accordingly, in one or more embodiments, the CaO concentration can be between 0 and 6 mol %. In various embodiments, the CaO concentration of the glass composition is in the range of about 0 mol % to about 4.24 mol %, or in the range of about 0 mol % to about 2 mol %, or in the range of about 0 mol % to about 1 mol %, or in the range of about 0 mol % to about 0.5 mol %, or in the range of about 0 mol % to about 0.1 mol %, and all subranges therebetween. In other embodiments, the CaO concentration of the glass composition is in the range of about 7 mol % to about 14 mol %, or from about 9 mol % to about 12 mol %.

SrO and BaO can both contribute to low liquidus temperatures (high liquidus viscosities). The selection and concentration of these oxides can be selected to avoid an increase in CTE and density and a decrease in modulus and annealing point. The relative proportions of SrO and BaO can be balanced so as to obtain a suitable combination of physical properties and liquidus viscosity such that the glass can be formed by a downdraw process. In various embodiments, the glass comprises SrO in the range of about 0 to about 8.0 mol %, or between about 0 mol % to about 4.3 mol %, or about 0 to about 5 mol %, 1 mol % to about 3 mol %, or about less than about 2.5 mol %, and all subranges therebetween. In one or more embodiments, the glass comprises BaO in the range of about 0 to about 5 mol %, or between 0 to about 4.3 mol %, or between 0 to about 2.0 mol %, or between 0 to about 1.0 mol %, or between 0 to about 0.5 mol %, and all subranges therebetween.

In addition to the above components, the glass compositions described herein can include various other oxides to adjust various physical, melting, fining, and forming attributes of the glasses. Examples of such other oxides include, but are not limited to, $TiO_2$, MnO, $V_2O_3$, $Fe_2O_3$, $ZrO_2$, ZnO, $Nb_2O_5$, $MoO_3$, $Ta_2O_5$, $WO_3$, $Y_2O_3$, $La_2O_3$ and $CeO_2$ as well as other rare earth oxides and phosphates. In one embodiment, the amount of each of these oxides can be less than or equal to 2.0 mole percent, and their total combined concentration can be less than or equal to 5.0 mole percent. In some embodiments, the glass composition comprises ZnO in an amount in the range of about 0 to about 3.5 mol %, or about 0 to about 3.01 mol %, or about 0 to about 2.0 mol %, and all subranges therebetween. In other embodiments, the glass composition comprises from about 0.1 mol % to about 1.0 mol % titanium oxide; from about 0.1 mol % to about 1.0 mol % vanadium oxide; from about 0.1 mol % to about 1.0 mol % niobium oxide; from about 0.1 mol % to about 1.0 mol % manganese oxide; from about 0.1 mol % to about 1.0 mol % zirconium oxide; from about 0.1 mol % to about 1.0 mol % tin oxide; from about 0.1 mol % to about 1.0 mol % molybdenum oxide; from about 0.1 mol % to about 1.0 mol % cerium oxide; and all subranges therebetween of any of the above listed transition metal oxides. The glass compositions described herein can also include various contaminants associated with batch materials and/or introduced into the glass by the melting, fining, and/or forming equipment used to produce the glass. The glasses can also contain $SnO_2$ either as a result of Joule melting using tin-oxide electrodes and/or through the batching of tin containing materials, e.g., $SnO_2$, SnO, $SnCO_3$, $SnC_2O_2$, etc.

The glass compositions described herein can contain some alkali constituents, e.g., these glasses are not alkali-free glasses. As used herein, an "alkali-free glass" is a glass having a total alkali concentration which is less than or equal to 0.1 mole percent, where the total alkali concentration is the sum of the $Na_2O$, $K_2O$, and $Li_2O$ concentrations. In some embodiments, the glass comprises $Li_2O$ in the range of about 0 to about 3.0 mol %, in the range of about 0 to about 3.01 mol %, in the range of about 0 to about 2.0 mol %, in the range of about 0 to about 1.0 mol %, less than about 3.01 mol %, or less than about 2.0 mol %, and all subranges therebetween. In other embodiments, the glass comprises $Na_2O$ in the range of about 3.5 mol % to about 13.5 mol %, in the range of about 3.52 mol % to about 13.25 mol %, in the range of about 4.0 mol % to about 12 mol %, in the range of about 6.0 mol % to about 15 mol %, or in the range of about 6.0 mol % to about 12 mol %, in the range of about 9.0 mol % to about 15 mol %, and all subranges therebetween. In some embodiments, the glass comprises $K_2O$ in the range of about 0 to about 5.0 mol %, in the range of about 0 to about 4.83 mol %, in the range of about 0 to about 2.0 mol %, in the range of about 0 to about 1.5 mol %, in the range of about 0 to about 1.0 mol %, or less than about 4.83 mol %, and all subranges therebetween.

In some embodiments, the glass compositions described herein can have one or more or all of the following compositional characteristics: (i) an $As_2O_3$ concentration of at most 0.05 to 1.0 mol %; (ii) an $Sb_2O_3$ concentration of at most 0.05 to 1.0 mol %; (iii) a $SnO_2$ concentration of at most 0.25 to 3.0 mol %.

$As_2O_3$ is an effective high temperature fining agent for display glasses, and in some embodiments described herein, $As_2O_3$ is used for fining because of its superior fining properties. However, $As_2O_3$ is poisonous and requires special handling during the glass manufacturing process. Accordingly, in certain embodiments, fining is performed without the use of substantial amounts of $As_2O_3$, i.e., the finished glass has at most 0.05 mole percent $As_2O_3$. In one embodiment, no $As_2O_3$ is purposely used in the fining of the glass. In such cases, the finished glass will typically have at most 0.005 mole percent $As_2O_3$ as a result of contaminants present in the batch materials and/or the equipment used to melt the batch materials.

Although not as toxic as $As_2O_3$, $Sb_2O_3$ is also poisonous and requires special handling. In addition, $Sb_2O_3$ raises the density, raises the CTE, and lowers the annealing point in comparison to glasses that use $As_2O_3$ or $SnO_2$ as a fining agent. Accordingly, in certain embodiments, fining is performed without the use of substantial amounts of $Sb_2O_3$, i.e., the finished glass has at most 0.05 mole percent $Sb_2O_3$. In another embodiment, no $Sb_2O_3$ is purposely used in the fining of the glass. In such cases, the finished glass will typically have at most 0.005 mole percent $Sb_2O_3$ as a result of contaminants present in the batch materials and/or the equipment used to melt the batch materials.

Compared to $As_2O_3$ and $Sb_2O_3$ fining, tin fining (i.e., $SnO_2$ fining) is less effective, but $SnO_2$ is a ubiquitous material that has no known hazardous properties. However, high concentrations of $SnO_2$ are not preferred as this can result in the formation of crystalline defects in display glasses. In one embodiment, the concentration of $SnO_2$ in the finished glass is less than or equal to 0.25 mole percent, in the range of about 0.07 to about 0.11 mol %, in the range of about 0 to about 2 mol %, from about 0 to about 3 mol %, and all subranges therebetween.

Tin fining can be used alone or in combination with other fining techniques if desired. For example, tin fining can be combined with halide fining, e.g., bromine fining. Other possible combinations include, but are not limited to, tin fining plus sulfate, sulfide, cerium oxide, mechanical bubbling, and/or vacuum fining. It is contemplated that these other fining techniques can be used alone. In certain embodiments, maintaining the $(MgO+CaO+SrO+BaO)/Al_2O_3$ ratio and individual alkaline earth concentrations within the ranges discussed above makes the fining process easier to perform and more effective.

In various embodiments, the glass may comprise $R_xO$ where R is Li, Na, K, Rb, Cs, and x is 2, or R is Zn, Mg, Ca, Sr or Ba, and x is 1. In some embodiments, $R_xO-Al_2O_3>0$. In other embodiments, $0<R_xO-Al_2O_3<15$. In some embodiments, $R_xO/Al_2O_3$ is between 0 and 10, between 0 and 5, greater than 1, or between 1.5 and 3.75, or between 1 and 6, or between 1.1 and 5.7, and all subranges therebetween. In other embodiments, $0<R_xO-Al_2O_3<15$. In further embodiments, x=2 and $R_2O-Al_2O_3<15$, <5, <0, between -8 and 0, or between -8 and -1, and all subranges therebetween. In additional embodiments, $R_2O-Al_2O_3<0$. In yet additional embodiments, x=2 and $R_2O-Al_2O_3-MgO>-10$, >-5, between 0 and -5, between 0 and -2, >-2, between -5 and 5, between -4.5 and 4, and all subranges therebetween. In further embodiments, x=2 and $R_xO/Al_2O_3$ is between 0 and 4, between 0 and 3.25, between 0.5 and 3.25, between 0.95 and 3.25, and all subranges therebetween. These ratios play significant roles in establishing the manufacturability of the glass article as well as determining its transmission performance. For example, glasses having $R_xO-Al_2O_3$ approximately equal to or larger than zero will tend to have better melting quality but if $R_xO-Al_2O_3$ becomes too large of a value, then the transmission curve will be adversely affected. Similarly, if $R_xO-Al_2O_3$ (e.g., $R_2O-Al_2O_3$) is within a given range as described above then the glass will likely have high transmission in the visible spectrum while maintaining meltability and suppressing the liquidus temperature of a glass. Similarly, the $R_2O-Al_2O_3-MgO$ values described above may also help suppress the liquidus temperature of the glass.

In one or more embodiments and as noted above, exemplary glasses can have low concentrations of elements that produce visible absorption when in a glass matrix. Such absorbers include transition elements such as Ti, V, Cr, Mn, Fe, Co, Ni and Cu, and rare earth elements with partially-filled f-orbitals, including Ce, Pr, Nd, Sm, Eu, Tb, Dy, Ho, Er and Tm. Of these, the most abundant in conventional raw materials used for glass melting are Fe, Cr and Ni. Iron is a common contaminant in sand, the source of $SiO_2$, and is a typical contaminant as well in raw material sources for aluminum, magnesium and calcium. Chromium and nickel are typically present at low concentrations in normal glass raw materials, but can be present in various ores of sand and are preferably controlled at a low concentration. Additionally, chromium and nickel can be introduced via contact with stainless steel, e.g., when raw material or cullet is jaw-crushed, through erosion of steel-lined mixers or screw feeders, or unintended contact with structural steel in the melting unit itself. The concentration of iron in some embodiments can be specifically less than 50 ppm, more specifically less than 40 ppm, or less than 25 ppm, and the concentration of Ni and Cr can be specifically less than 5 ppm, and more specifically less than 2 ppm. In further embodiments, the concentration of all other absorbers listed above may be less than 1 ppm for each. In various embodiments the glass comprises 1 ppm or less of Co, Ni, and Cr, or alternatively less than 1 ppm of Co, Ni, and Cr. In various embodiments, the transition elements (V, Cr, Mn, Fe, Co, Ni and Cu) may be present in the glass at 0.1 wt % or less. In some embodiments, the concentration of Fe can be <about 50 ppm, <about 40 ppm, <about 30 ppm, <about 20 ppm, or <about 10 ppm. In other embodiments, Fe+30Cr+35Ni <about 60 ppm, <about 50 ppm, <about 40 ppm, <about 30 ppm, <about 20 ppm, or <about 10 ppm.

In other embodiments, it has been discovered that the addition of certain transition metal oxides that do not cause absorption from 300 nm to 650 nm and that have absorption bands <about 300 nm will prevent network defects from forming processes and will prevent color centers (e.g., absorption of light from 300 nm to 650 nm) post UV exposure when curing ink since the bond by the transition metal oxide in the glass network will absorb the light instead of allowing the light to break up the fundamental bonds of the glass network. Thus, exemplary embodiments can include any one or combination of the following transition metal oxides to minimize UV color center formation: from about 0.1 mol % to about 3.0 mol % zinc oxide; from about 0.1 mol % to about 1.0 mol % titanium oxide; from about 0.1 mol % to about 1.0 mol % vanadium oxide; from about 0.1 mol % to about 1.0 mol % niobium oxide; from about 0.1 mol % to about 1.0 mol % manganese oxide; from about 0.1 mol % to about 1.0 mol % zirconium oxide; from about 0.1 mol % to about 1.0 mol % arsenic oxide; from about 0.1 mol % to about 1.0 mol % tin oxide; from about 0.1 mol % to about 1.0 mol % molybdenum oxide; from about 0.1 mol % to about 1.0 mol % antimony oxide; from about 0.1 mol % to about 1.0 mol % cerium oxide; and all subranges therebetween of any of the above listed transition metal oxides. In some embodiments, an exemplary glass can contain from 0.1 mol % to less than or no more than about 3.0 mol % of any combination of zinc oxide, titanium oxide, vanadium oxide, niobium oxide, manganese oxide, zirconium oxide, arsenic oxide, tin oxide, molybdenum oxide, antimony oxide, and cerium oxide.

Even in the case that the concentrations of transition metals are within the above described ranges, there can be matrix and redox effects that result in undesired absorption. As an example, it is well-known to those skilled in the art that iron occurs in two valences in glass, the +3 or ferric state, and the +2 or ferrous state. In glass, Fe' produces absorptions at approximately 380, 420 and 435 nm, whereas Fe' absorbs mostly at IR wavelengths. Therefore, according to one or more embodiments, it may be desirable to force as much iron as possible into the ferrous state to achieve high transmission at visible wavelengths. One non-limiting method to accomplish this is to add components to the glass batch that are reducing in nature. Such components could include carbon, hydrocarbons, or reduced forms of certain metalloids, e.g., silicon, boron or aluminum. However it is achieved, if iron levels were within the described range, according to one or more embodiments, at least 10% of the iron in the ferrous state and more specifically greater than 20% of the iron in the ferrous state, improved transmissions can be produced at short wavelengths. Thus, in various embodiments, the concentration of iron in the glass produces less than 1.1 dB/500 mm of attenuation in the glass. Further, in various embodiments, the concentration of V+Cr+Mn+Fe+Co+Ni+Cu produces 2 dB/500 mm or less of light attenuation in the glass when the ratio $(Li_2O+Na_2O+K_2O+Rb_2O+Cs_2O+MgO+ZnO+CaO+SrO+BaO)/Al_2O_3$ for borosilicate glass is between 0 and 4.

The valence and coordination state of iron in a glass matrix can also be affected by the bulk composition of the glass. For example, iron redox ratio has been examined in molten glasses in the system $SiO_2$—$K_2O$—$Al_2O_3$ equilibrated in air at high temperature. It was found that the fraction of iron as Fe' increases with the ratio $K_2O/(K_2O+Al_2O_3)$, which in practical terms will translate to greater absorption at short wavelengths. In exploring this matrix effect, it was discovered that the ratios $(Li_2O+Na_2O+K_2O+Rb_2O+Cs_2O)/Al_2O_3$ and $(MgO+CaO+ZnO+SrO+BaO)/Al_2O_3$ can also be important for maximizing transmission in borosilicate glasses. Thus, for the $R_xO$ ranges described above, transmission at exemplary wavelengths can be maximized for a given iron content. This is due in part to the higher proportion of Fe', and partially to matrix effects associated with the coordination environment of iron.

Further to the exemplary compositions the attenuation impact of each element may be estimated by identifying the wavelength in the visible where it attenuates most strongly. In examples shown in Table 1 below, the coefficients of absorption of the various transition metals have been experimentally determined in relation to the concentrations of $Al_2O_3$ to $R_xO$ (however, only the modifier $Na_2O$ has been shown below for brevity).

TABLE 1

| | dB/ppm/500 mm | | |
|---|---|---|---|
| | $Al_2O_3 > Na_2O$ | $Al_2O_3 = Na_2O$ | $Al_2O_3 < Na_2O$ |
| V | 0.119 | 0.109 | 0.054 |
| Cr | 2.059 | 1.869 | 9.427 |
| Mn | 0.145 | 0.06 | 0.331 |
| Fe | 0.336 | 0.037 | 0.064 |
| Co | 1.202 | 2.412 | 3.7 |
| Ni | 0.863 | 0.617 | 0.949 |
| Cu | 0.108 | 0.092 | 0.11 |

With the exception of V (vanadium), a minimum attenuation is found for glasses with concentrations of $Al_2O_3$=$Na_2O$, or more generally for $Al_2O_3$—$R_xO$. In various instances the transition metals may assume two or more valences (e.g., Fe can be both +2 and +3), so to some extent the redox ratio of these various valences may be impacted by the bulk composition. Transition metals respond differently to what are known as "crystal field" or "ligand field" effects that arise from interactions of the electrons in their partially-filled d-orbital with the surrounding anions (oxygen, in this case), particularly if there are changes in the number of anion nearest neighbors (also referred to as coordination number). Thus, it is likely that both redox ratio and crystal field effects contribute to this result.

The coefficients of absorption of the various transition metals may also be utilized to determine the attenuation of the glass composition over a path length in the visible spectrum (i.e., between 380 and 700 nm) and address solarization issues, as shown in Table 2 below and discussed in further detail below.

TABLE 2

| | |
|---|---|
| $Al_2O_3 - R_xO = 4$ | 0.119V + 2.059Cr + 0.145Mn + 0.336Fe + 1.202Co + 0.863Ni + 0.108Cu < 2 |
| $Al_2O_3 \sim R_xO = 0$ | 0.109V + 1.869Cr + 0.06Mn + 0.037Fe + 2.412Co + 0.617Ni + 0.092Cu < 2 |
| $Al_2O_3 < R_xO = -4$ | 0.054V + 9.427Cr + 0.331Mn + 0.064Fe + 3.7Co + 0.949Ni + 0.11Cu < 2 |

Of course the values identified in Table 2 are exemplary only and should not limit the scope of the claims appended herewith. For example, it was also unexpectedly discovered that a high transmittance glass could be obtained when Fe+30Cr+35Ni <60 ppm. In some embodiments, the concentration of Fe can be <about 50 ppm, <about 40 ppm, <about 30 ppm, <about 20 ppm, or <about 10 ppm. In other embodiments, Fe+30Cr+35Ni <about 50 ppm, <about 40 ppm, <about 30 ppm, <about 20 ppm, or <about 10 ppm. It was also unexpectedly discovered that the addition of certain transition metal oxides that do not cause absorption from 300 nm to 650 nm and that have absorption bands <about 300 nm will prevent network defects from forming processes and will prevent color centers (e.g., absorption of light from 300 nm to 650 nm) post UV exposure when curing ink since the bond by the transition metal oxide in the glass network will absorb the light instead of allowing the light to break up the fundamental bonds of the glass network. Thus, exemplary embodiments can include any one or combination of the following transition metal oxides to minimize UV color center formation: from about 0.1 mol % to about 3.0 mol % zinc oxide; from about 0.1 mol % to about 1.0 mol % titanium oxide; from about 0.1 mol % to about 1.0 mol % vanadium oxide; from about 0.1 mol % to about 1.0 mol % niobium oxide; from about 0.1 mol % to about 1.0 mol % manganese oxide; from about 0.1 mol % to about 1.0 mol % zirconium oxide; from about 0.1 mol % to about 1.0 mol % arsenic oxide; from about 0.1 mol % to about 1.0 mol % tin oxide; from about 0.1 mol % to about 1.0 mol % molybdenum oxide; from about 0.1 mol % to about 1.0 mol % antimony oxide; from about 0.1 mol % to about 1.0 mol % cerium oxide; and all subranges therebetween of any of the above listed transition metal oxides. In some embodiments, an exemplary glass can contain from 0.1 mol % to less than or no more than about 3.0 mol % of any combination of zinc oxide, titanium oxide, vanadium oxide, niobium oxide, manganese oxide, zirconium oxide, arsenic oxide, tin oxide, molybdenum oxide, antimony oxide, and cerium oxide Tables 3A, 3B, 4A, and 4B provide some exemplary non-limiting examples of glasses prepared for embodiments of the present subject matter.

TABLE 3A

|  | wt % | mol % |
| --- | --- | --- |
| $SiO_2$ | 66.72 | 77.22 |
| $SiO_2$ (diff) | 67.003 | |
| $Al_2O_3$ | 12 | 7.62 |
| $B_2O_3$ | 8.15 | 7.58 |
| $Li_2O$ | 0 | 0 |
| $Na_2O$ | 7.73 | 8.08 |
| $K_2O$ | 0.013 | 0.01 |
| ZnO | 0 | 0 |
| MgO | 1.38 | 2.22 |
| CaO | 0.029 | 0.03 |
| SrO | 3.35 | 2.09 |
| BaO | | 0.08 |
| $SnO_2$ | 0.176 | 0.08 |
| $Fe_2O_3$ | 0.12 | |

TABLE 3B

|  | wt % | mol % |
| --- | --- | --- |
| $SiO_2$ | 74.521 | 76.27 |
| $SiO_2$ (diff) | 74.431 | |
| $Al_2O_3$ | 7.214 | 4.36 |
| $B_2O_3$ | 0 | 0 |
| $Li_2O$ | 0 | 0 |
| $Na_2O$ | 10.197 | 10.13 |
| $K_2O$ | 0.003 | 0 |
| ZnO | 1.577 | 1.19 |
| MgO | 4.503 | 6.88 |
| CaO | 0.03 | 0.03 |
| SrO | 1.69 | 1 |
| BaO | 0.031 | 0.01 |
| $SnO_2$ | 0.224 | 0.09 |
| $Fe_2O_3$ | | |

TABLE 4A

|  | wt % | mol % |
| --- | --- | --- |
| $SiO_2$ | 74.749 | 76.37 |
| $SiO_2$ (diff) | 74.847 | |
| $Al_2O_3$ | 8.613 | 5.18 |
| $B_2O_3$ | 0 | 0 |
| $Li_2O$ | 0 | 0 |
| $Na_2O$ | 11.788 | 11.66 |
| $K_2O$ | 0.003 | 0 |
| ZnO | 0 | 0 |
| MgO | 4.344 | 6.61 |
| CaO | 0.027 | 0.03 |
| SrO | 0 | 0 |
| BaO | 0 | 0 |
| $SnO_2$ | 0.24 | 0.1 |
| $Fe_2O_3$ | 0.128 | |

TABLE 4B

|  | wt % | mol % |
| --- | --- | --- |
| $SiO_2$ | 73.38 | 76.17 |
| $SiO_2$ (diff) | 73.823 | |
| $Al_2O_3$ | 7.15 | 4.35 |
| $B_2O_3$ | 0 | 0 |
| $Li_2O$ | 0 | 0 |
| $Na_2O$ | 8.55 | 8.56 |
| $K_2O$ | 2.40 | 1.58 |
| ZnO | 1.57 | 1.2 |
| MgO | 4.50 | 6.92 |
| CaO | 0.05 | 0.05 |
| SrO | 1.74 | 1.04 |
| BaO | 0 | 0 |
| $SnO_2$ | 0.22 | 0.09 |
| $Fe_2O_3$ | | |

Exemplary compositions as heretofore described can thus be used to achieve a strain point ranging from about 525° C. to about 575° C., from about 540° C. to about 570° C., or from about 545° C. to about 565° C. and all subranges therebetween. In one embodiment, the strain point is about 547° C., and in another embodiment, the strain point is about 565° C. An exemplary annealing point can range from about 575° C. to about 625° C., from about 590° C. to about 620° C., and all subranges therebetween. In one embodiment, the annealing point is about 593° C., and in another embodiment, the annealing point is about 618° C. An exemplary softening point of a glass ranges from about 800° C. to about 890° C., from about 820° C. to about 880° C., or from about 835° C. to about 875° C. and all subranges therebetween. In one embodiment, the softening point is about 836.2° C., in another embodiment, the softening point is about 874.7° C. The density of exemplary glass compositions can range from about 1.95 gm/cc @ 20° C. to about 2.7 gm/cc @ 20° C., from about 2.1 gm/cc @ 20° C. to about 2.4 gm/cc @ 20° C., or from about 2.3 gm/cc @ 20° C. to about 2.4 gm/cc @ 20° C. and all subranges therebetween. In one embodiment the density is about 2.389 gm/cc @ 20° C., and in another embodiment the density is about 2.388 gm/cc @ 20° C. CTEs (0-300° C.) for exemplary embodiments can range from about 30×10-7/° C. to about 95×10-7/° C., from about 50×10-7/° C. to about 80×10-7/° C., or from about 55×10-7/° C. to about 80×10-7/° C. and all subranges therebetween. In one embodiment the CTE is about 55.7×10-7/° C. and in another embodiment the CTE is about 69×10-7/° C.

Certain embodiments and compositions described herein have provided an internal transmission from 400-700 nm greater than 90%, greater than 91%, greater than 92%, greater than 93%, greater than 94%, and even greater than 95%. Internal transmittance can be measured by comparing the light transmitted through a sample to the light emitted from a source. Broadband, incoherent light may be cylindrically focused on the end of the material to be tested. The light emitted from the far side may be collected by an integrating sphere fiber coupled to a spectrometer and forms the sample data. Reference data is obtained by removing the material under test from the system, translating the integrating sphere directly in front of the focusing optic, and collecting the light through the same apparatus as the reference data. The absorption at a given wavelength is then given by:

$$\text{absorption(dB/m)} = \frac{-10\log\frac{T_{sample\ date}}{T_{reference\ data}}}{(Pathlength_{sample\ data} - Pathlength_{reference\ data})}$$

The internal transmittance over 0.5 m is given by:

$$\text{Transmittance (\%)} = 100 \times 10^{-absorption \times 0.8/10}$$

Thus, exemplary embodiments described herein can have an internal transmittance at 450 nm with 500 mm in length of greater than 85%, greater than 90%, greater than 91%, greater than 92%, greater than 93%, greater than 94%, and even greater than 95%. Exemplary embodiments described herein can also have an internal transmittance at 550 nm with 500 mm in length of greater than 90%, greater than 91%, greater than 92%, greater than 93%, greater than 94%, and even greater than 96%. Further embodiments described herein can have a transmittance at 630 nm with 500 mm in length of greater than 85%, greater than 90%, greater than 91%, greater than 92%, greater than 93%, greater than 94%, and even greater than 95%.

In one or more embodiments, the glass can be strengthened. For example, certain characteristics, such as a moderate compressive stress (CS), high depth of compressive layer (DOL), and/or moderate central tension (CT) can be provided in an exemplary glass. One exemplary process includes chemically strengthening the glass by preparing a glass capable of ion exchange. The glass can then be subjected to an ion exchange process, and thereafter the glass can be subjected to an anneal process if necessary. Of course, if the CS and DOL of the glass are desired at the levels resulting from the ion exchange step, then no annealing step is required. In other embodiments, an acid etching process can be used to increase the CS on appropriate glass surfaces. The ion exchange process can involve subjecting the glass to a molten salt bath including $KNO_3$, preferably relatively pure $KNO_3$ for one or more first temperatures within the range of about 400-500° C. and/or for a first time period within the range of about 1-24 hours, such as, but not limited to, about 8 hours. It is noted that other salt bath compositions are possible and would be within the skill level of an artisan to consider such alternatives. Thus, the disclosure of $KNO_3$ should not limit the scope of the claims appended herewith. Such an exemplary ion exchange process can produce an initial CS at the surface of the glass, an initial DOL into the glass, and an initial CT within the glass. Annealing can then produce a final CS, final DOL and final CT as desired.

Figure 2:
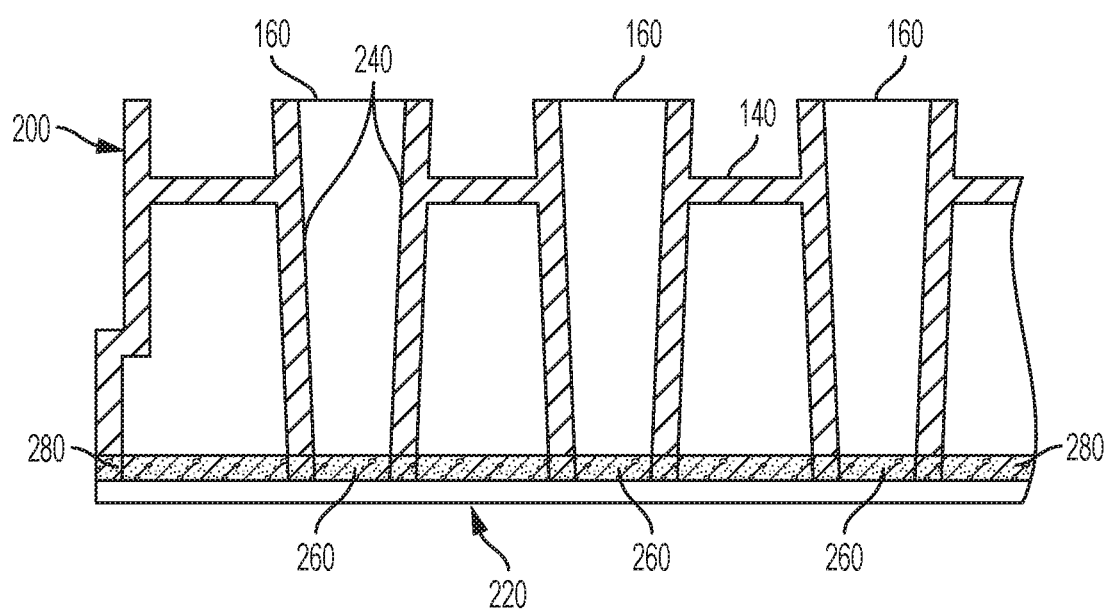
FIG. 2 is a cross sectional view of a multiwell plate in accordance with embodiments of the present disclosure.

FIGS. 1 and 2 illustrate two cross sectional views of a multiwell plate in accordance with embodiments of the present disclosure. The multiwell plate is a substrate as described herein and includes at least one glass substrate portion which is a lower plate of the multiwell plate. The multiwell plate 100 as shown is of two-part construction including an upper portion 200 and a lower plate 220. The upper portion 200 includes a peripheral skirt 120, a top surface 140 and sidewalls 240 of wells 160. The lower plate 220 forms bottom walls 260 of the wells 160. The upper portion 200 and lower plate 220 may be joined together at an interface by an adhesive 280. The upper portion 200 includes a frame that forms the sidewalls 240 of an array of open-ended sample wells 160 in addition to the peripheral skirt 120, and the top surface 140. The upper portion 200 may be formed from a polymeric material (e.g., polystyrene).

The lower plate 220 may be a sheet of glass having a composition as described herein. The lower plate 220 may also be substantially flat. The glass sheet can then be altered to fit the dimensions of the desired size multiwell plate 100. The glass material forms a transparent bottom wall 260 for each sample well 160 and permits viewing therethrough. The transparent lower plate 220 also allows for light emissions to be measured through the bottom walls 260. As shown, the lower plate 220 is substantially flat and is sized to form the bottom walls 260 for all of the wells 160 of the upper plate 200.

By utilizing glass compositions as described herein, the lower plate 220 has high optical quality, high optical flatness and low auto-fluorescence. As compared to glasses conventionally used in glass bottomed multiwell plates, low auto-fluorescence emitted from the glass of the lower plate 220 leads to reduced fluorescence noise and improved accuracy of fluorescent-detection methods. High optical quality improves the results of any microscopic viewing technique, as well as the results of fluorescent-detection methods. Optical flatness of the bottom walls 260 of the wells 160 is important particularly when the multiwell plate 100 is used for microscopic viewing of specimens and living cells within the wells 160. This flatness also promotes even cell distribution and limits optical variation. Although the bottom walls 260 may be of any thickness, the bottom wall 260 may have a thickness of less than or equal to about 500 microns and their flatness is in the range of 0-10 microns across the diameter of the outer bottommost surface of an individual well 160. For example, the thickness of the bottom walls 260 may be between about 75 microns and about 500 microns, or between about 100 microns and about 400 microns, or between about 150 microns and about 350 microns, or even between about 175 microns and about 300 microns.

Figure 3:
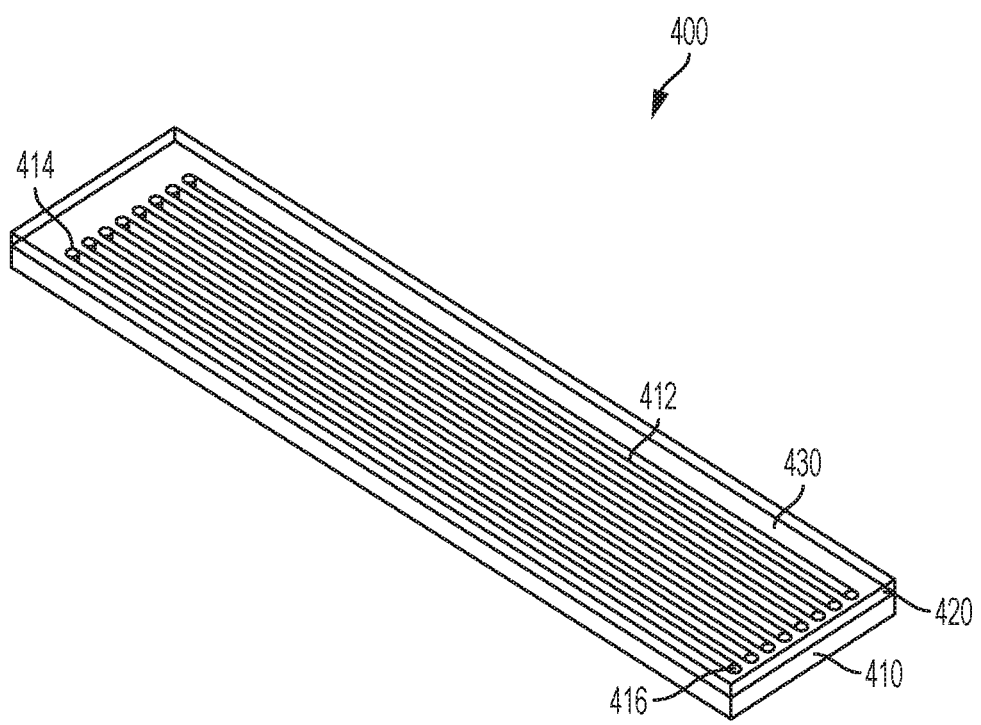
FIG. 3 is a perspective view of a flow cell in accordance with embodiments of the present disclosure.
Figure 4:
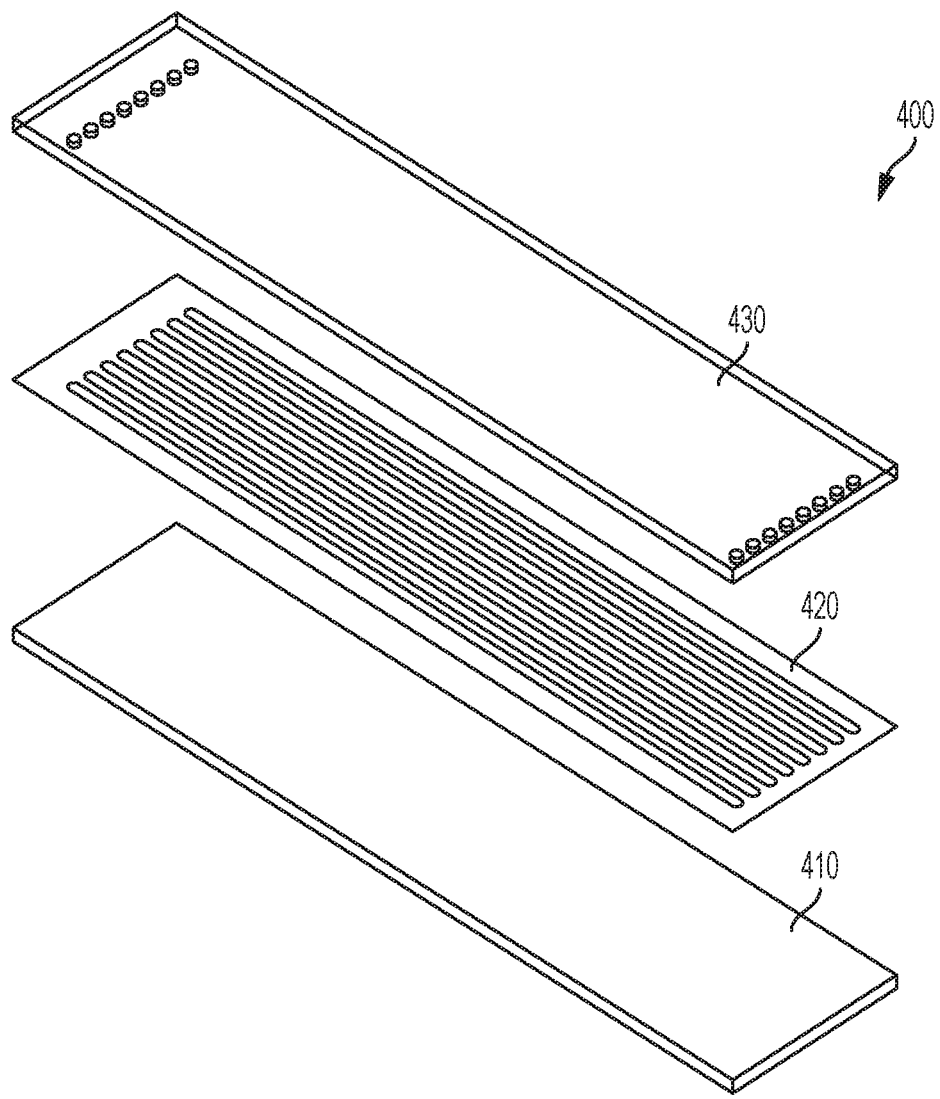
FIG. 4 is an exploded view of a flow cell in accordance with embodiments of the present disclosure.

FIGS. 3 and 4 illustrate exemplary flow cells in accordance with embodiments of the present disclosure. The flow cell is a substrate as described herein and includes at least one layer. The at least one glass substrate portion of the flow cell is at least one of the at least one layer. The flow cell 400 includes a bottom or base layer 410, a channel spacer or layer 420 overlaying the base layer 410, and a cover layer 430. The base layer 410 may have a thickness of between about 500 microns and about 1,500 microns, for example about 1,000 microns. The channel layer 420 may have a thickness of about 80 microns to about 200 microns, such as about 100 microns. The cover layer 430 may have a thickness of between about 150 microns and about 500 microns, for example, about 300 microns. When assembled, the layers 410, 420, and 430 form at least one enclosed flow channel 412 having inlet and outlet ports 414 and 416, respectively, at either end through the cover layer 430. The flow cell 400 may be configured to engage or sealably mate with a manifold. Alternatively, the inlets 414 and outlets 416 of the flow cell 400 may open at the bottom of, or on the sides of, the flow cell 400. Also, while the figures illustrate a flow cell 400 formed of three layers, flow cells in accordance with embodiments of the present disclosure may include two layers, such as a base layer having channels etched, ablated or formed therein and a cover layer. Still other embodiments may include flow cells having only one layer which includes a flow channel etched, ablated or otherwise formed therein.

The layers 410, 420, and 430 of the flow cell 400 may be attached to one another in a number of different ways. For example, the layers can be attached via adhesives, bonding (e.g., heat, chemical, etc.), and/or mechanical methods. For example, low-temperature glass-bonding processes using chemical agents or solder glasses may be utilized, or high-temperature fusion processes in which surfaces of the complementary layers to be joined are placed in close proximity and heated sufficiently to cause those surfaces to soften and bond to each other. Those skilled in the art will be familiar with numerous methods and techniques to attach various glass/polymer layers to one another. Optionally the flow cell 400 may include a bonding agent between at least one of the layers 410, 420, and 430, wherein the bonding agent facilitates attachment of layers 410, 420, and 430 of the flow cell 400 to one another. The bonding agent may be for example, but not limited to, a material comprising metal, metal oxide, glass, ceramic or plastic.

Furthermore, while the flow cell 400 as illustrated includes eight channels 412, flow cells in accordance with embodiments of the present disclosure may include any number of channels. For example, the flow cell 400 may include only one channel, or two, or three, or four, or sixteen, or more channels. Additionally, the channels 412 may have different depths and/or widths (different both between channels in different flow cells and different between channels within the same flow cell). For example, the channels 412 may be between 50 microns and about 500 microns deep, or between about 100 microns and about 400 microns deep, or between about 150 microns and about 300 microns deep. The channels 412 as described herein may be formed in the flow cell 400 using an etching process which utilizes an acid etch such as an HF-etch. The acid etch is applied to the layer in which the channels are to be formed. A protection mask is used to protect the material of the layer which is not intended to be removed while exposing to the acid etch the material of the layer intended to be removed At least one layer of a flow cell in accordance with embodiments of the present disclosure may be formed from glass having a composition as described herein. For example, the base layer may be formed from glass compositions as described herein. Additionally any of the channel layer 420 and the cover layer 430 may also be formed from glass compositions as described herein. Optionally, the different layers of the flow cells may be formed from different materials within the same flow cell. Thus, the base layer 410, the channel layer 420 and the cover layer 430 can optionally be formed from different materials, with preferred embodiments having a base layer 410 formed from glass compositions as described herein. The different materials include, for example, photosensitive glass such as Foturan® (commercially available from Schott AG, Mainz, Germany) or Fotoform® (commercially available from Hoya Corporation, Tokyo, Japan). Optionally, at least one of the layers may be formed from silicon. The different materials may also include polymers which have excellent optical properties and can withstand elevated temperatures, such as cyclic olefin copolymers, such as Topas® (commercially available from Ticona, Florence, Ky.) or Zeonor® (commercially available from Zeon Chemicals, Louisville, Ky.). Other polymer materials may be, for example but without limitation, polystyrene (PS), polycarbonate (PC), poly(methyl methacrylate) (PMMA), Poly(ethylene terephthalate) (PET), polypropylene (PP) and poly(dimethylsiloxane) (PDMS).

Figure 5:
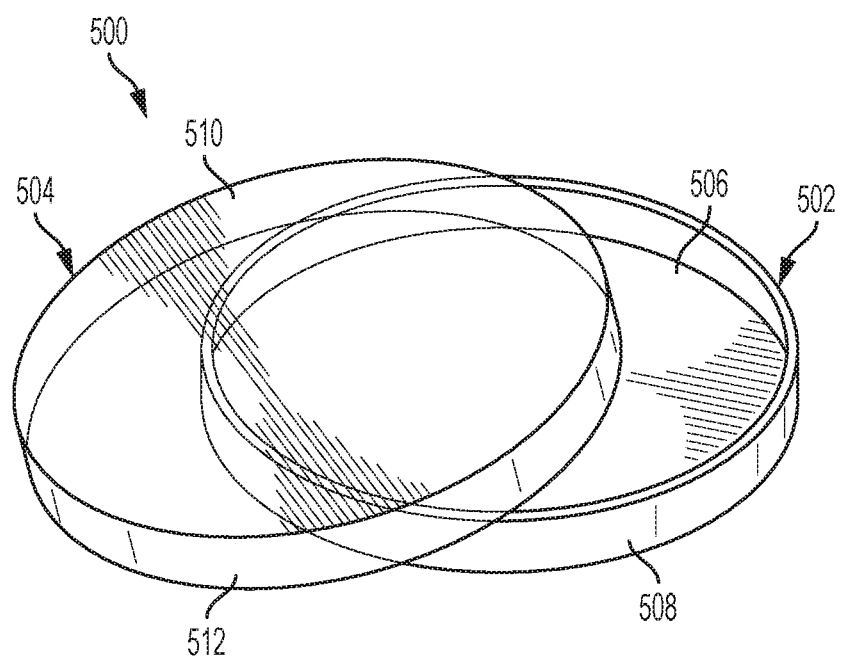
FIG. 5 is a petri dish in accordance with embodiments of the present disclosure.

FIG. 5 illustrates a petri dish in accordance with embodiments of the present disclosure, wherein the petri dish is formed from a glass having a composition as described herein. The petri dish is a substrate as described herein and includes at least one glass substrate portion which is at least one of the bottom panel and the base sidewall. The petri dish 500 includes a circular base 502 and a circular lid 504. The circular base 502 has a flat bottom panel 506 and a base sidewall 508 extending substantially perpendicularly upward from the flat bottom panel 506. The circular lid 504 has a lid panel 510 and a lid sidewall 512 extending substantially perpendicularly downward from the lid panel 510. The inner diameter of the of the lid sidewall 512 is greater than the outer diameter of the base sidewall 508 such that the circular lid 504 when set on the circular base 502 covers the circular base 502 with the lid sidewall 512 extending over and covering the top of the base sidewall 508. The base sidewall 508 is of greater height than the depth of the lid sidewall 512. According to embodiments of the present disclosure, at least one portion of the petri dish, such as the circular base 502 and the circular lid 504, is formed from a glass having a composition as described herein. According to one embodiment, the flat bottom panel 506 of the circular base 502 is formed from a glass having a composition as described herein.

By utilizing glass compositions as described herein, the petri dish 100 has high optical quality and low auto-fluorescence. As compared to glasses conventionally used in petri dishes, low auto-fluorescence emitted from the glass of the petri dish 100 leads to reduced fluorescence noise and improved accuracy of fluorescent-detection methods. High optical quality improves the results of any microscopic viewing technique, as well as the results of fluorescent-detection methods.

Examples

The following examples are set forth below to illustrate the methods and results according to the disclosed subject matter. These examples are not intended to be inclusive of all embodiments of the subject matter disclosed herein, but rather to illustrate representative methods and results. These examples are not intended to exclude equivalents and variations of the present disclosure which are apparent to one skilled in the art.

Efforts have been made to ensure accuracy with respect to numbers (e.g., amounts, temperature, etc.) but some errors and deviations should be accounted for. Unless indicated otherwise, temperature is in ° C. or is at ambient temperature, and pressure is at or near atmospheric. The compositions themselves are given in mole percent on an oxide basis and have been normalized to 100%. There are numerous variations and combinations of reaction conditions, e.g., component concentrations, temperatures, pressures and other reaction ranges and conditions that can be used to optimize the product purity and yield obtained from the described process. Only reasonable and routine experimentation will be required to optimize such process conditions.

The glass properties set forth herein and in Table 5 below were determined in accordance with techniques conventional in the glass art. Thus, the linear coefficient of thermal expansion (CTE) over the temperature range 25-300° C. is expressed in terms of $\times 10^{-7}/°$ C. and the annealing point is expressed in terms of ° C. These were determined from fiber elongation techniques (ASTM references E228-85 and C336, respectively). The density in terms of grams/cm$^3$ was measured via the Archimedes method (ASTM C693). The melting temperature in terms of ° C. (defined as the temperature at which the glass melt demonstrates a viscosity of 200 poises) was calculated employing a Fulcher equation fit to high temperature viscosity data measured via rotating cylinders viscometry (ASTM C965-81).

The liquidus temperature of the glass in terms of ° C. was measured using the standard gradient boat liquidus method of ASTM C829-81. This involves placing crushed glass particles in a platinum boat, placing the boat in a furnace having a region of gradient temperatures, heating the boat in an appropriate temperature region for 24 hours, and determining by means of microscopic examination the highest temperature at which crystals appear in the interior of the glass. More particularly, the glass sample is removed from the Pt boat in one piece, and examined using polarized light microscopy to identify the location and nature of crystals which have formed against the Pt and air interfaces, and in the interior of the sample. Because the gradient of the furnace is very well known, temperature vs. location can be well estimated, within 5-10° C. The temperature at which crystals are observed in the internal portion of the sample is taken to represent the liquidus temperature of the glass (for the corresponding test period). Testing is sometimes carried out at longer times (e.g. 72 hours), to observe slower growing phases. The liquidus viscosity in poises was determined from the liquidus temperature and the coefficients of the Fulcher equation. If included, Young's modulus values in terms of GPa were determined using a resonant ultrasonic spectroscopy technique of the general type set forth in ASTM E1875-00e1.

The exemplary glasses of the tables herein were prepared using a commercial sand as a silica source, milled such that 90% by weight passed through a standard U.S. 100 mesh sieve. Alumina was the alumina source, periclase was the source for MgO, limestone the source for CaO, strontium carbonate, strontium nitrate or a mix thereof was the source for SrO, barium carbonate was the source for BaO, and tin (IV) oxide was the source for $SnO_2$. The raw materials were thoroughly mixed, loaded into a platinum vessel suspended in a furnace heated by silicon carbide glowbars, melted and stirred for several hours at temperatures between 1600 and 1650° C. to ensure homogeneity, and delivered through an orifice at the base of the platinum vessel. The resulting patties of glass were annealed at or near the annealing point, and then subjected to various experimental methods to determine physical, viscous and liquidus attributes.

These methods are not unique, and the glasses of the tables herein can be prepared using standard methods well-known to those skilled in the art. Such methods include a continuous melting process, such as would be performed in a continuous melting process, wherein the melter used in the continuous melting process is heated by gas, by electric power, or combinations thereof.

Raw materials appropriate for producing exemplary glasses include commercially available sands as sources for $SiO_2$; alumina, aluminum hydroxide, hydrated forms of alumina, and various aluminosilicates, nitrates and halides as sources for $Al_2O_3$; boric acid, anhydrous boric acid and boric oxide as sources for $B_2O_3$; periclase, dolomite (also a source of CaO), magnesia, magnesium carbonate, magnesium hydroxide, and various forms of magnesium silicates, aluminosilicates, nitrates and halides as sources for MgO; limestone, aragonite, dolomite (also a source of MgO), wolastonite, and various forms of calcium silicates, aluminosilicates, nitrates and halides as sources for CaO; and oxides, carbonates, nitrates and halides of strontium and barium. If a chemical fining agent is desired, tin can be added as $SnO_2$, as a mixed oxide with another major glass component (e.g., $CaSnO_3$), or in oxidizing conditions as SnO, tin oxalate, tin halide, or other compounds of tin known to those skilled in the art.

The glasses in the tables herein can contain $SnO_2$ as a fining agent, but other chemical fining agents could also be employed to obtain glass of sufficient quality for intended applications of the substrates as described herein. For example, exemplary glasses could employ any one or combinations of $As_2O_3$, $Sb_2O_3$, $CeO_2$, $Fe_2O_3$, and halides as deliberate additions to facilitate fining, and any of these could be used in conjunction with the $SnO_2$ chemical fining agent shown in the examples. Of these, $As_2O_3$ and $Sb_2O_3$ are generally recognized as hazardous materials, subject to control in waste streams such as might be generated in the course of glass manufacture or in the processing of TFT panels. It is therefore desirable to limit the concentration of $As_2O_3$ and $Sb_2O_3$ individually or in combination to no more than 0.005 mol %.

In addition to the elements deliberately incorporated into exemplary glasses, nearly all stable elements in the periodic table are present in glasses at some level, either through low levels of contamination in the raw materials, through high-temperature erosion of refractories and precious metals in the manufacturing process, or through deliberate introduction at low levels to fine tune the attributes of the final glass. For example, zirconium may be introduced as a contaminant via interaction with zirconium-rich refractories. As a further example, platinum and rhodium may be introduced via interactions with precious metals. As a further example, iron may be introduced as a tramp in raw materials, or deliberately added to enhance control of gaseous inclusions. As a further example, manganese may be introduced to control color or to enhance control of gaseous inclusions.

Hydrogen is inevitably present in the form of the hydroxyl anion, OH—, and its presence can be ascertained via standard infrared spectroscopy techniques. Dissolved hydroxyl ions significantly and nonlinearly impact the annealing point of exemplary glasses, and thus to obtain the desired annealing point it may be necessary to adjust the concentrations of major oxide components so as to compensate. Hydroxyl ion concentration can be controlled to some extent through choice of raw materials or choice of melting system. For example, boric acid is a major source of hydroxyls, and replacing boric acid with boric oxide can be a useful means to control hydroxyl concentration in the final glass. The same reasoning applies to other potential raw materials comprising hydroxyl ions, hydrates, or compounds comprising physisorbed or chemisorbed water molecules. If burners are used in the melting process, then hydroxyl ions can also be introduced through the combustion products from combustion of natural gas and related hydrocarbons, and thus it may be desirable to shift the energy used in melting from burners to electrodes to compensate. Alternatively, one might instead employ an iterative process of adjusting major oxide components so as to compensate for the deleterious impact of dissolved hydroxyl ions.

Sulfur is often present in natural gas, and likewise is a tramp component in many carbonate, nitrate, halide, and oxide raw materials. In the form of $SO_2$, sulfur can be a troublesome source of gaseous inclusions. The tendency to form $SO_2$-rich defects can be managed to a significant degree by controlling sulfur levels in the raw materials, and by incorporating low levels of comparatively reduced multivalent cations into the glass matrix. While not wishing to be bound by theory, it appears that $SO_2$-rich gaseous inclusions arise primarily through reduction of sulfate ($SO_4^=$) dissolved in the glass. The elevated barium concentrations of exemplary glasses appear to increase sulfur retention in the glass in early stages of inciting, but as noted above, barium is required to obtain low liquidus temperature, and hence high T35k–Tliq and high liquidus viscosity. Deliberately controlling sulfur levels in raw materials to a low level is a useful means of reducing dissolved sulfur (presumably as sulfate) in the glass. In particular, sulfur is preferably less than 200 ppm by weight in the batch materials, and more preferably less than 100 ppm by weight in the batch materials.

Reduced multivalents can also be used to control the tendency of exemplary glasses to form $SO_2$ blisters. While not wishing to be bound by theory, these elements behave as potential electron donors that suppress the electromotive force for sulfate reduction. Sulfate reduction can be written in terms of a half reaction such as $SO_4= \rightarrow SO_2+O_2+2e-$ where e− denotes an electron. The "equilibrium constant" for the half reaction is $K_{eq}=[SO_2][O_2][e-]^2/[SO_4=]$ where the brackets denote chemical activities. Ideally one would like to force the reaction so as to create sulfate from $SO_2$, $O_2$ and 2e−. Adding nitrates, peroxides, or other oxygen-rich raw materials may help, but also may work against sulfate reduction in the early stages of melting, which may counteract the benefits of adding them in the first place. $SO_2$ has very low solubility in most glasses, and so is impractical to add to the glass melting process. Electrons may be "added" through reduced multivalents. For example, an appropriate electron-donating half reaction for ferrous iron ($Fe^{2+}$) is expressed as $2Fe^{2+} \rightarrow 2Fe^{3+}+2e-$ This "activity" of electrons can force the sulfate reduction reaction to the left, stabilizing $SO_4=$ in the glass. Suitable reduced multivalents include, but are not limited to, $Fe^{2+}$, $Mn^{2+}$, $Sn^{2+}$, $Sb^{3+}$, $As^{3+}$, $V^{3+}$, $Ti^{3+}$, and others familiar to those skilled in the art. In each case, it may be important to minimize the concentrations of such components so as to avoid deleterious impact on color of the glass, or in the case of As and Sb, to avoid adding such components at a high enough level so as to complication of waste management in an end-user's process.

In addition to the major oxides components of exemplary glasses, and the minor or tramp constituents noted above, halides may be present at various levels, either as contaminants introduced through the choice of raw materials, or as deliberate components used to eliminate gaseous inclusions in the glass. As a fining agent, halides may be incorporated at a level of about 0.4 mol % or less, though it is generally desirable to use lower amounts if possible to avoid corrosion of off-gas handling equipment. In some embodiments, the concentrations of individual halide elements are below about 200 ppm by weight for each individual halide, or below about 800 ppm by weight for the sum of all halide elements.

In addition to these major oxide components, minor and tramp components, multivalents and halide fining agents, it may be useful to incorporate low concentrations of other colorless oxide components to achieve desired physical, solarization, optical or viscoelastic properties. Such oxides include, but are not limited to, $TiO_2$, $ZrO_2$, $Nb_2O_5$, $Ta_2O_5$, $MoO_3$, $WO_3$, $ZnO$, $In_2O_3$, $Ga_2O_3$, $Bi_2O_3$, $GeO_2$, $PhO$, $SeO_3$, $TeO_2$, $Y_2O_3$, $La_2O_3$, $Gd_2O_3$, and others known to those skilled in the art. By adjusting the relative proportions of the major oxide components of exemplary glasses, such colorless oxides can be added to a level of up to about 2 mol % to 3 mol % without unacceptable impact to annealing point, T35k–Tliq or liquidus viscosity. For example, some embodiments can include any one or combination of the following transition metal oxides to minimize UV color center formation: from about 0.1 mol % to about 3.0 mol % zinc oxide; from about 0.1 mol % to about 1.0 mol % titanium oxide; from about 0.1 mol % to about 1.0 mol % vanadium oxide; from about 0.1 mol % to about 1.0 mol % niobium oxide; from about 0.1 mol % to about 1.0 mol % manganese oxide; from about 0.1 mol % to about 1.0 mol % zirconium oxide; from about 0.1 mol % to about 1.0 mol % arsenic oxide; from about 0.1 mol % to about 1.0 mol % tin oxide; from about 0.1 mol % to about 1.0 mol % molybdenum oxide; from about 0.1 mol % to about 1.0 mol % antimony oxide; from about 0.1 mol % to about 1.0 mol % cerium oxide; and all subranges therebetween of any of the above listed transition metal oxides. In some embodiments, an exemplary glass can contain from 0.1 mol % to less than or no more than about 3.0 mol % of any combination of zinc oxide, titanium oxide, vanadium oxide, niobium oxide, manganese oxide, zirconium oxide, arsenic oxide, tin oxide, molybdenum oxide, antimony oxide, and cerium oxide.

Table 5 shows examples of glasses (samples 1-106) with high transmissibility as described herein.

TABLE 5

|  | 1 | 2 | 3 | 4 | 5 | 6 | 7 |
|---|---|---|---|---|---|---|---|
| $SiO_2$ | 73.14 | 77.69 | 68.94 | 76.51 | 77.73 | 68.72 | 74.43 |
| $Al_2O_3$ | 6.95 | 3.95 | 9.06 | 3.97 | 4.22 | 9.13 | 6.44 |
| $B_2O_3$ | 0 | 0 | 7.21 | 0 | 0 | 7.21 | 3.74 |
| $Li_2O$ | 0 | 0.98 | 0 | 0 | 0 | 0 | 0 |
| $Na_2O$ | 10.78 | 9.76 | 10.02 | 8.79 | 10.74 | 10.17 | 9.8 |
| $K_2O$ | 0 | 0 | 0.6 | 0 | 0.02 | 0.63 | 0 |
| ZnO | 0 | 0.97 | 0 | 0.97 | 0.97 | 0 | 0.01 |
| MgO | 6.01 | 5.5 | 1.99 | 6.61 | 5.79 | 3.04 | 4.39 |
| CaO | 0.04 | 0.03 | 0.04 | 0.04 | 0.03 | 0.92 | 0.03 |
| SrO | 2.96 | 0.99 | 1.99 | 2.98 | 0.37 | 0 | 1.05 |
| BaO | 0 | 0.01 | 0 | 0 | 0 | 0 | 0 |
| $SnO_2$ | 0.07 | 0.09 | 0.1 | 0.09 | 0.09 | 0.09 | 0.08 |
| $R_2O/Al_2O_3$ | 1.55 | 2.72 | 1.17 | 2.21 | 2.55 | 1.18 | 1.52 |
| $(R_2O + RO)/Al_2O_3$ | 2.85 | 4.62 | 1.62 | 4.88 | 4.25 | 1.62 | 2.37 |
| $R_2O - Al_2O_3 - MgO$ | −2.18 | 1.29 | −0.43 | −1.79 | 0.75 | −1.37 | −1.03 |
| strain | 580 | 523 | 540 | 575 | 562 | 535 | 559 |
| anneal | 629 | 574 | 584 | 625 | 615 | 581 | 606 |
| soft | 871.4 | 830.8 | 806 | 868.9 | 867.6 | 823 | 841.5 |
| CTE | 68.5 | 64.9 | 66.5 | 61 | 64.5 | 66.6 | 62.4 |
| density | 2.477 | 2.418 | 2.425 | 2.469 | 2.401 | 2.382 | 2.401 |
| strain (bbv) | 574.7 | 522 | 532.2 | 572.1 | 560 | 531.6 | 551.4 |
| anneal (bbv) | 622.9 | 570.7 | 578 | 621 | 609.9 | 578.1 | 599.9 |
| last bbv visc | 12.012 | 12.012 | 611.8 | 12.0259 | 12.0249 | 613.8 | 12.0292 |
| last bbv T | 660.8 | 609.2 | 12.0146 | 659.3 | 648.8 | 12.0317 | 636.6 |
| soft (ppv) |  |  |  |  |  |  |  |
| Color shift Viscosity |  |  |  | 0.005664 |  |  | 0.007524 |
| A | −2.074 | −2.014 | −1.614 | −1.873 | −1.89 | −1.945 | −1.65 |
| B | 6417.4 | 6566.1 | 5769.2 | 5987.3 | 6330 | 6446.7 | 6045.6 |

TABLE 5-continued

| | | | | | | | |
|---|---|---|---|---|---|---|---|
| To | 205.2 | 140.9 | 188 | 228.4 | 193.9 | 152.3 | 194.5 |
| T(200 P) | 1672 | 1663 | 1662 | 1663 | 1704 | 1671 | 1725 |
| 72 hr gradient boat | | | | | | | |
| Int | 1005 | 1010 | 935 | 1015 | 970 | 965 | 970 |
| int liq visc | 8.91E+05 | 347581.7 | | 5.48E+05 | 1.85E+06 | | 1.40E+06 |

| | 8 | 9 | 10 | 11 | 12 | 13 | 14 |
|---|---|---|---|---|---|---|---|
| $SiO_2$ | 76.23 | 72.53 | 74.49 | 70.26 | 72.16 | 68.99 | 69.58 |
| $Al_2O_3$ | 4.38 | 7.67 | 7.13 | 8.66 | 7.68 | 9.01 | 9.72 |
| $B_2O_3$ | 0 | 7.59 | 1.88 | 7.59 | 7.63 | 7.18 | 7.48 |
| $Li_2O$ | 0 | 0 | 0 | 0 | 0 | 0 | 0 |
| $Na_2O$ | 8.13 | 7.75 | 10.09 | 7.79 | 6.98 | 9.05 | 9.2 |
| $K_2O$ | 1.96 | 0.01 | 0 | 1.16 | 1.04 | 0.59 | 0.42 |
| ZnO | 1.17 | 0.96 | 0 | 0 | 0 | 0 | 0 |
| MgO | 6.95 | 1.23 | 3.43 | 2.26 | 2.25 | 3.05 | 2.37 |
| CaO | 0.05 | 0.03 | 0.03 | 0.04 | 0.04 | 0.04 | 0.03 |
| SrO | 1.01 | 2.09 | 2.8 | 2.09 | 2.09 | 1.92 | 1.06 |
| BaO | 0 | 0 | 0 | 0 | 0 | 0 | 0 |
| $SnO_2$ | 0.09 | 0.07 | 0.08 | 0.07 | 0.07 | 0.09 | 0.07 |
| $R_2O/Al_2O_3$ | 2.30 | 1.01 | 1.42 | 1.03 | 1.04 | 1.07 | 0.99 |
| $(R_2O + RO)/Al_2O_3$ | 4.40 | 1.57 | 2.29 | 1.54 | 1.61 | 1.63 | 1.35 |
| $R_2O - Al_2O_3 - MgO$ | −1.24 | −1.14 | −0.47 | −1.97 | −1.91 | −2.42 | −2.47 |
| strain | 564 | 543 | 567 | 543 | 544 | 547 | 550 |
| anneal | 616 | 589 | 614 | 589 | 591 | 591 | 598 |
| soft | 877.9 | 830.2 | 857.2 | 832.3 | 840.8 | 828.8 | 872.5 |
| CTE | 66.4 | 55.2 | 64.9 | 61.3 | 56.8 | 63.3 | 60.9 |
| density | 2.426 | 2.402 | 2.452 | 2.402 | 2.388 | 2.414 | 2.375 |
| strain (bbv) | 562.1 | 537.7 | 560.5 | 536.5 | 539.6 | 538.5 | 542 |
| anneal (bbv) | 613.5 | 584.9 | 607.9 | 585 | 588.1 | 585.7 | 593.2 |
| last bbv visc | 12.0302 | 12.0236 | 12.0205 | 620.6 | 625.3 | 620.5 | 631.4 |
| last bbv T | 654 | 621.7 | 644.7 | 12.0374 | 12.0301 | 12.0372 | 12.0026 |
| soft (ppv) | | | | | | | |
| Color shift | | | | | | | |
| Viscosity | | | | | | | |
| A | −2.187 | −1.802 | −1.739 | −1.9 | −1.9 | −1.946 | −2.425 |
| B | 6861.1 | 6467.9 | 6089.3 | 6503.7 | 6594.4 | 6398.2 | 7698.3 |
| To | 171.3 | 153.6 | 202 | 152.4 | 149.6 | 162.6 | 97.6 |
| T(200 P) | 1700 | 1730 | 1709 | 1701 | 1719 | 1669 | 1727 |
| 72 hr gradient boat | | | | | | | |
| int | 1005 | 935 | 990 | 925 | 930 | 975 | 1010 |
| int liq visc | 1103314 | 2.99E+06 | 9.74E+05 | 3.30E+06 | 3.55E+06 | | 1.03E+06 |

| | 15 | 16 | 17 | 18 | 19 | 20 | 21 |
|---|---|---|---|---|---|---|---|
| $SiO_2$ | 77.04 | 72.25 | 76.05 | 70.31 | 73.35 | 77.66 | 75.15 |
| $Al_2O_3$ | 3.67 | 7.65 | 4.5 | 8.68 | 3.97 | 3.95 | 3.98 |
| $B_2O_3$ | 1.89 | 7.56 | 0 | 9.51 | 0 | 0 | 0 |
| $Li_2O$ | 0 | 0 | 0 | 0 | 0 | 0 | 0 |
| $Na_2O$ | 10.64 | 8.08 | 10.02 | 7.81 | 10.84 | 9.25 | 12.86 |
| $K_2O$ | 0 | 0.01 | 0 | 1.16 | 0 | 1.44 | 0 |
| ZnO | 0 | 0.96 | 1.76 | 0 | 0 | 0.97 | 0 |
| MgO | 6.58 | 1.72 | 6.51 | 1.24 | 6.73 | 6.57 | 6.79 |
| CaO | 0.03 | 0.03 | 0.03 | 0.03 | 0.04 | 0.03 | 0.03 |
| SrO | 0 | 1.59 | 0.99 | 1.11 | 4.89 | 0 | 1.02 |
| BaO | 0 | 0 | 0 | 0 | 0.03 | 0 | 0.01 |
| $SnO_2$ | 0.08 | 0.08 | 0.1 | 0.08 | 0.09 | 0.09 | 0.1 |
| $R_2O/Al_2O_3$ | 2.90 | 1.06 | 2.23 | 1.03 | 2.73 | 2.71 | 3.23 |
| $(R_2O + RO)/Al_2O_3$ | 4.70 | 1.62 | 4.29 | 1.31 | 5.68 | 4.62 | 5.20 |
| $R_2O - Al_2O_3 - MgO$ | 0.39 | −1.28 | −0.99 | −0.95 | 0.14 | 0.17 | 2.09 |
| strain | 544 | 541 | 574.0 | 525 | 538 | 562.0 | 523 |
| anneal | 591 | 587 | 626.0 | 575 | 582 | 616 | 570 |
| soft | 830.3 | 838.8 | 881.6 | 828.4 | 797.6 | 878.9 | 813.2 |
| CTE | 64.2 | 55.1 | 63.9 | 59.7 | 73.5 | 66.3 | 74 |
| density | 2.385 | 2.389 | 2.441 | 2.353 | 2.506 | 2.395 | 2.424 |
| strain (bbv) | 538.6 | 535.7 | 574.1 | 519.4 | 531.7 | 562.6 | 518.2 |
| anneal (bbv) | 585.9 | 583.7 | 623.9 | 568.4 | 576.9 | 614.3 | 564.3 |
| last bbv visc | 12.016 | 12.0317 | 12.0021 | 604.3 | 12.0046 | 12.0158 | 12.0098 |
| last bbv T | 622.7 | 621.2 | 663.8 | 12.031 | 612.4 | 655.4 | 600.2 |
| soft (ppv) | | | | | | | |
| Color shift | | | | | | | |
| Viscosity | | | | | | | |
| A | −1.683 | −2.028 | −1.953 | −1.9 | −1.79 | −2.058 | −1.911 |
| B | 5890.6 | 6953.1 | 6229.6 | 6845.9 | 5350.3 | 6609.3 | 5970.1 |

TABLE 5-continued

| | | | | | | | |
|---|---|---|---|---|---|---|---|
| To | 192.6 | 126.4 | 217.3 | 111.1 | 224.4 | 185.7 | 171.2 |
| T(200 P) | 1671 | 1733 | 1682 | 1741 | 1532 | 1702 | 1589 |
| 72 hr gradient boat | | | | | | | |
| int | 990 | 900 | 1020 | 830 | 890 | 890 | 855 |
| int liq visc | 5.06E+05 | 9.12E+06 | 642403 | 4.20E+07 | 1.77E+06 | 21193919 | 6.60E+06 |

| | 22 | 23 | 24 | 25 | 26 | 27 | 28 |
|---|---|---|---|---|---|---|---|
| $SiO_2$ | 76.88 | 75.67 | 76.97 | 76.15 | 77.64 | 76.27 | 75.22 |
| $Al_2O_3$ | 4.18 | 5.79 | 4.68 | 4.61 | 3.96 | 4.36 | 6.94 |
| $B_2O_3$ | 0 | 1.75 | 0 | 0 | 0 | 0 | 0 |
| $Li_2O$ | 0 | 0 | 0 | 0 | 0 | 0 | 0 |
| $Na_2O$ | 11.69 | 10.67 | 8.71 | 9.6 | 10.7 | 10.13 | 12.77 |
| $K_2O$ | 0 | 0 | 2.9 | 0 | 0 | 0 | 0 |
| ZnO | 0 | 0.01 | 0 | 1.18 | 0.98 | 1.19 | 0 |
| MgO | 7.08 | 5.44 | 6.59 | 6.94 | 6.08 | 6.88 | 1.93 |
| CaO | 0.03 | 0.03 | 0.03 | 0.03 | 0.03 | 0.03 | 0.03 |
| SrO | 0 | 0.53 | 0 | 0.9 | 0 | 1 | 2.97 |
| BaO | 0 | 0 | 0 | 0.46 | 0.49 | 0.01 | 0 |
| $SnO_2$ | 0.1 | 0.08 | 0.08 | 0.1 | 0.09 | 0.09 | 0.07 |
| $R_2O/Al_2O_3$ | 2.80 | 1.84 | 2.48 | 2.08 | 2.70 | 2.32 | 1.84 |
| $(R_2O + RO)/Al_2O_3$ | 4.50 | 2.88 | 3.90 | 4.15 | 4.62 | 4.41 | 2.55 |
| $R_2O - Al_2O_3 - MgO$ | 0.43 | −0.56 | 0.34 | −1.95 | 0.66 | −1.11 | 3.9 |
| strain | 552 | 565 | 549 | 578 | 557 | 573 | 534 |
| anneal | 603 | 613 | 603 | 631 | 609 | 625 | 581 |
| soft | 853.3 | 860.1 | 870.4 | 886.8 | 862.3 | 877.3 | 813.3 |
| CTE | 69.1 | 64.7 | 73.2 | 62.6 | 65 | 63.2 | 74.1 |
| density | 2.386 | 2.398 | 2.385 | 2.446 | 2.414 | 2.428 | 2.468 |
| strain (bbv) | 549.9 | 557.8 | 546.5 | 578.5 | 555.6 | 573.4 | 525.8 |
| anneal (bbv) | 599 | 605.9 | 598.2 | 629.1 | 604.6 | 623.9 | 572.9 |
| last bbv visc | 12.0259 | 12.0026 | 12.0207 | 12.0197 | 12.0072 | 12.0121 | 12.0378 |
| last bbv T | 637 | 643.5 | 638.3 | 669.3 | 643.4 | 663.3 | 608.9 |
| soft (ppv) | | | | | | | |
| Color shift | | 0.006389 | | | | | |
| Viscosity | | | | | | | |
| A | −2.073 | −1.873 | −2.356 | −1.932 | −1.959 | −2.134 | −1.567 |
| B | 6603.1 | 6377.4 | 7386.5 | 6230.8 | 6333.5 | 6554.9 | 5710.6 |
| To | 168.6 | 183.8 | 124.5 | 222.6 | 189.8 | 201 | 189 |
| T(200 P) | 1678 | 1712 | 1711 | 1695 | 1677 | 1679 | 1665 |
| 72 hr gradient boat | | | | | | | |
| int | 940 | 950 | 840 | 1050 | 950 | 985 | 960 |
| int liq visc | 3.07E+06 | 2.82E+06 | 9.28E+07 | 3.97E+05 | 2.36E+06 | 1.69E+06 | 6.91E+05 |

| | 29 | 30 | 31 | 32 | 33 | 34 | 35 |
|---|---|---|---|---|---|---|---|
| $SiO_2$ | 77.56 | 72.53 | 77.31 | 72.17 | 68.19 | 72.39 | 72.28 |
| $Al_2O_3$ | 3.96 | 6.83 | 4.98 | 7.68 | 10.84 | 7.38 | 7.37 |
| $B_2O_3$ | 0 | 9.75 | 0 | 7.63 | 7.37 | 7.45 | 7.34 |
| $Li_2O$ | 0 | 0 | 0 | 1.06 | 0 | 0 | 0 |
| $Na_2O$ | 10.26 | 6.78 | 11.19 | 6.98 | 10.47 | 8.52 | 8.96 |
| $K_2O$ | 0 | 0.01 | 0 | 0.01 | 0.01 | 0 | 0 |
| ZnO | 0.97 | 0 | 0.01 | 0 | 0 | 0 | 0 |
| MgO | 6.61 | 1.96 | 6.37 | 2.24 | 2.42 | 2.09 | 1.99 |
| CaO | 0.03 | 0.04 | 0.03 | 0.03 | 0.04 | 0.02 | 0.02 |
| SrO | 0 | 1.95 | 0 | 2.09 | 0.53 | 2.01 | 1.9 |
| BaO | 0.48 | 0 | 0 | 0 | 0 | 0 | 0 |
| $SnO_2$ | 0.09 | 0.09 | 0.08 | 0.08 | 0.07 | 0.08 | 0.08 |
| $R_2O/Al_2O_3$ | 2.59 | 0.99 | 2.25 | 1.05 | 0.97 | 1.15 | 1.22 |
| $(R_2O + RO)/Al_2O_3$ | 4.63 | 1.57 | 3.53 | 1.62 | 1.24 | 1.71 | 1.75 |
| $R_2O - Al_2O_3 - MgO$ | −0.31 | −2 | −0.16 | −1.87 | −2.78 | −0.95 | −0.4 |
| strain | 567 | 535 | 573 | 529 | 553 | 546 | 547 |
| anneal | 619 | 583 | 626 | 576 | 604 | 591 | 591 |
| soft | 872.3 | 835.4 | 880.9 | 826.8 | 881.8 | 823 | 816.4 |
| CTE | 63.5 | 50.2 | 66.5 | 53.7 | 63.2 | 58.4 | 57.1 |
| density | 2.413 | 2.356 | 2.38 | 2.386 | 2.369 | 2.393 | 2.397 |
| strain (bbv) | 561 | 532.7 | 568.6 | 525.3 | 547.8 | 540.8 | 539.9 |
| anneal (bbv) | 612.8 | 681.5 | 619.4 | 571.5 | 600.2 | 587.3 | 585.9 |
| last bbv visc | 12.0281 | 619.3 | 12.0051 | 607.5 | 640.7 | 12.0332 | 12.0107 |
| last bbv T | 652.3 | 12.0096 | 659.5 | 12.0195 | 12.0195 | 623.2 | 622.1 |
| soft (ppv) | | | | | | | |
| Color shift | | | 0.00606 | | | | |
| Viscosity | | | | | | | |
| A | −1.933 | −1.9 | −1.997 | −1.81 | −2.843 | −1.536 | −1.49 |
| B | 6346.9 | 6842.9 | 6560.7 | 6533.2 | 8399.5 | 5834.9 | 5653 |

TABLE 5-continued

| | | | | | | | |
|---|---|---|---|---|---|---|---|
| To | 197.7 | 129 | 190.9 | 134.7 | 75.5 | 192.8 | 202.9 |
| T(200 P) | 1697 | 1758 | 1717 | 1724 | 1708 | 1713 | 1694 |
| 72 hr gradient boat | | | | | | | |
| int | 990 | 930 | 880 | 940 | 1000 | 910 | 920 |
| int liq visc | 1.20E+06 | 4.39E+06 | 3.34E+07 | 2.01E+06 | 1.75E+06 | 3.98E+06 | 2.47E+06 |

| | 36 | 37 | 38 | 39 | 40 | 41 | 42 |
|---|---|---|---|---|---|---|---|
| $SiO_2$ | 73.65 | 75.25 | 76.99 | 75.63 | 76.37 | 73.43 | 75.92 |
| $Al_2O_3$ | 7.32 | 5.97 | 3.45 | 5.01 | 5.17 | 6.71 | 4.61 |
| $B_2O_3$ | 3.84 | 0.96 | 0 | 1.72 | 0 | 5.61 | 0 |
| $Li_2O$ | 0 | 0 | 0 | 0 | 0 | 0 | 0 |
| $Na_2O$ | 9.39 | 10.77 | 5.95 | 10.55 | 11.17 | 6.52 | 9.67 |
| $K_2O$ | 0 | 0 | 2.03 | 0 | 0 | 0.97 | 0 |
| ZnO | 0 | 0 | 2.91 | 0 | 0 | 0 | 1.2 |
| MgO | 3.05 | 3.84 | 6.56 | 3.88 | 6.11 | 2.47 | 7.01 |
| CaO | 0.03 | 0.03 | 0.03 | 0.03 | 0.03 | 0.87 | 0.03 |
| SrO | 2.58 | 3.03 | 1.95 | 3.04 | 1.01 | 3.25 | 1.41 |
| BaO | 0 | 0 | 0 | 0 | 0 | 0.05 | 0 |
| $SnO_2$ | 0.08 | 0.08 | 0.1 | 0.07 | 0.09 | 0.08 | 0.1 |
| $R_2O/Al_2O_3$ | 1.28 | 1.80 | 2.31 | 2.11 | 2.16 | 1.12 | 2.10 |
| $(R_2O + RO)/Al_2O_3$ | 2.06 | 2.96 | 5.63 | 3.49 | 3.54 | 2.11 | 4.19 |
| $R_2O - Al_2O_3 - MgO$ | −0.98 | 0.96 | −2.03 | 1.66 | −0.11 | −1.69 | −1.95 |
| strain | 559 | 551 | 586 | 539 | 561 | 558 | 580 |
| anneal | 606 | 598 | 639 | 585 | 613 | 603 | 632 |
| soft | 843.7 | 832.6 | 898.4 | 806.9 | 865.0 | 57.8 | 885.4 |
| CTE | 61.7 | 67.8 | 59 | 67.1 | 68.2 | 835.9 | 61.8 |
| density | 2.437 | 2.463 | 2.474 | 2.464 | 2.411 | 2.442 | 2.441 |
| strain (bbv) | 552.7 | 545.8 | 586.9 | 532.8 | 560 | 551.9 | 579.8 |
| anneal (bbv) | 600.6 | 593.7 | 638.1 | 577.8 | 609.4 | 599 | 629.8 |
| last bbv visc | 12.0199 | 12.0153 | 12.0022 | 12.0136 | 12.1063 | 12.0089 | 12.0309 |
| last bbv T | 637.5 | 630.8 | 679.1 | 612.5 | 648 | 634.9 | 669.4 |
| soft (ppv) | | | | | | | |
| Color shift | | | | | | | |
| Viscosity | | | | | | | |
| A | −1.753 | −1.659 | −1.98 | −1.563 | −1.949 | −1.721 | −1.92 |
| B | 6249.6 | 5855.6 | 6350.9 | 5507.5 | 6428.1 | 6078.8 | 6206.9 |
| To | 183.5 | 202.4 | 224.9 | 206.6 | 190.5 | 191.9 | 224.4 |
| T(200 P) | 1725 | 1681 | 1708 | 1632 | 1703 | 1703 | 1695 |
| 72 hr gradient boat | | | | | | | |
| int | 960 | 935 | 1095 | 890 | 920 | 920 | 1065 |
| int liq visc | 1.97E+06 | 2.16E+06 | 2.08E+05 | 3.13E+06 | 7.29E+06 | 4.24E+06 | 2.91E+05 |

| | 43 | 44 | 45 | 46 | 47 | 48 | 49 |
|---|---|---|---|---|---|---|---|
| $SiO_2$ | 70.93 | 77.84 | 74.12 | 68.66 | 74.36 | 68.62 | 72.25 |
| $Al_2O_3$ | 8.63 | 4.35 | 6.06 | 10.09 | 6.45 | 10.06 | 7.65 |
| $B_2O_3$ | 7.58 | 0 | 3.78 | 7.25 | 3.86 | 7.29 | 7.56 |
| $Li_2O$ | 0 | 0 | 0 | 0 | 0 | 0 | 0 |
| $Na_2O$ | 8.08 | 10.65 | 5 | 10.24 | 9.76 | 11.01 | 8.08 |
| $K_2O$ | 0.76 | 0 | 1.93 | 0.65 | 0 | 0 | 0.01 |
| ZnO | 0 | 0.96 | 0 | 0 | 0 | 0 | 0.96 |
| MgO | 2.28 | 6.05 | 2.77 | 2.02 | 4.35 | 1.93 | 1.72 |
| CaO | 0.04 | 0.03 | 1.73 | 0.92 | 0.03 | 0.02 | 0.03 |
| SrO | 1.56 | 0 | 4.41 | 0 | 1.04 | 0.93 | 1.59 |
| BaO | 0 | 0 | 0.07 | 0 | 0.01 | 0 | 0 |
| $SnO_2$ | 0.07 | 0.09 | 0.08 | 0.1 | 0.07 | 0.08 | 0.08 |
| $R_2O/Al_2O_3$ | 1.02 | 2.45 | 1.14 | 1.08 | 1.51 | 1.09 | 1.06 |
| $(R_2O + RO)/Al_2O_3$ | 1.47 | 4.07 | 2.63 | 1.37 | 2.36 | 1.38 | 1.62 |
| $R_2O - Al_2O_3 + MgO$ | −2.07 | 0.25 | −1.9 | −1.22 | −1.04 | −0.98 | −1.28 |
| strain | 543 | 572 | 572 | 540 | 554 | 553 | 541 |
| anneal | 592 | 625 | 617 | 588 | 601 | 598 | 587 |
| soft | 852.7 | 880.6 | 59.7 | 842.9 | 840.9 | 847.6 | 838.8 |
| CTE | 59.2 | 64.1 | 851.4 | 66.4 | 62 | 65.7 | 55.1 |
| density | 2.382 | 2.392 | 2.485 | 2.373 | 2.405 | 2.387 | 2.389 |
| strain (bbv) | 537.8 | 570.1 | 565.6 | 536.1 | 545.1 | 543 | 535.7 |
| anneal (bbv) | 587.6 | 621 | 613.2 | 585.1 | 593.1 | 591 | 583.7 |
| last bbv visc | 624.4 | 12.0015 | 12.0184 | 621.3 | 12.0279 | 12.0124 | 12.0317 |
| last bbv T | 12.025 | 661.2 | 649.1 | 12.0299 | 629.7 | 628.6 | 621.2 |
| soft (ppv) | | | | | | | |
| Color shift | | | | | | | |
| Viscosity | | | | | | | |
| A | −2.165 | −1.975 | −1.855 | −2.206 | −1.828 | −1.755 | −2.028 |
| B | 7218.9 | 6471.2 | 6197.3 | 7123.4 | 6425.7 | 6217.7 | 6953.1 |

TABLE 5-continued

|  | | | | | | | |
|---|---|---|---|---|---|---|---|
| To | 115.6 | 198.1 | 202.4 | 120.6 | 165.8 | 176.7 | 126.4 |
| T(200 P) | 1732 | 1711 | 1694 | 1701 | 1722 | 1710 | 1733 |
| 72 hr gradient boat | | | | | | | |
| int | 960 | 950 | 975 | 920 | 965 | 975 | 900 |
| int liq visc | 2.42E+06 | 4.28E+06 | 1.47E+06 |  | 1.63E+06 | 1.08E+06 | 9.12E+06 |

|  | 50 | 51 | 52 | 53 | 54 | 55 | 56 |
|---|---|---|---|---|---|---|---|
| $SiO_2$ | 72.23 | 75.59 | 77.16 | 76.9 | 76.55 | 74.95 | 72.58 |
| $Al_2O_3$ | 7.62 | 4.99 | 3.95 | 4.68 | 3.97 | 5.43 | 6.98 |
| $B_2O_3$ | 9.1 | 1.84 | 0 | 0 | 0 | 1.78 | 7.49 |
| $Li_2O$ | 0 | 0 | 0 | 0 | 0 | 0 | 0 |
| $Na_2O$ | 7.53 | 5.75 | 10.84 | 11.68 | 9.3 | 3.52 | 8.51 |
| $K_2O$ | 0.01 | 4.83 | 0 | 0 | 1.49 | 2.9 | 0 |
| ZnO | 0 | 0 | 0 | 0 | 1.97 | 0 | 0 |
| MgO | 2.24 | 3.84 | 4.86 | 6.57 | 6.56 | 3.08 | 2.19 |
| CaO | 0.03 | 0.03 | 0.03 | 0.03 | 0.03 | 2.6 | 0.02 |
| SrO | 1.09 | 2.99 | 3.01 | 0 | 0 | 5.54 | 2.07 |
| BaO | 0 | 0 | 0 | 0 | 0 | 0.09 | 0 |
| $SnO_2$ | 0.08 | 0.08 | 0.09 | 0.08 | 0.1 | 0.08 | 0.08 |
| $R_2O/Al_2O_3$ | 0.99 | 2.12 | 2.74 | 2.50 | 2.72 | 1.18 | 1.22 |
| $(R_2O + RO)/Al_2O_3$ | 1.43 | 3.49 | 4.74 | 3.91 | 4.87 | 3.27 | 1.83 |
| $R_2O - Al_2O_3 - MgO$ | −2.32 | 1.75 | 2.03 | 0.43 | 0.26 | −2.09 | −0.66 |
| strain | 535 | 540 | 528 | 558 | 563 | 590 | 547 |
| anneal | 585 | 586 | 577 | 610 | 616 | 639 | 591 |
| soft | 859.3 | 818.4 | 814.9 | 867.7 | 876.7 | 61.2 | 814.5 |
| CTE | 52.3 | 73.4 | 69.3 | 68.6 | 67.3 | 878.7 | 57.3 |
| density | 2.340 | 2.463 | 2.437 | 2.385 | 2.418 | 2.52 | 2.397 |
| strain (bbv) | 533 | 532.3 | 524 | 554 | 559.9 | 585.9 | 540.2 |
| anneal (bbv) | 584.1 | 579.8 | 570.9 | 604.9 | 611.7 | 635.6 | 585.9 |
| last bbv visc | 621.6 | 12.0024 | 12.0156 | 12.0012 | 12.0115 | 12.004 | 12.028 |
| last bbv T | 12.026 | 616.9 | 607.4 | 644.5 | 652.3 | 673.4 | 621.4 |
| soft (ppv) | | | | | | | |
| Color shift | | | | | | | |
| Viscosity | | | | | | | |
| A | −2.186 | −1.822 | −1.824 | −2.042 | −2.154 | −2.01 | −1.511 |
| B | 7447.2 | 6267.2 | 6020.9 | 6562.4 | 6682.2 | 6255.3 | 5752.6 |
| To | 97.3 | 163.4 | 172.3 | 177.1 | 180.5 | 227 | 196.1 |
| T(200 P) | 1757 | 1683 | 1632 | 1688 | 1680 | 1678 | 1705 |
| 72 hr gradient boat | | | | | | | |
| int | 995 | 875 | 950 | 925 | 1040 | 1030 | 880 |
| int liq visc | 1.29E+06 | 9.66E+06 | 8.28E+05 | 5.40E+06 | 4.17E+05 | 6.02E+05 | 7.95E+06 |

|  | 57 | 58 | 59 | 60 | 61 | 62 | 63 |
|---|---|---|---|---|---|---|---|
| $SiO_2$ | 72.21 | 76.24 | 72.07 | 78.17 | 76.2 | 76.91 | 68.92 |
| $Al_2O_3$ | 7.57 | 5.16 | 7.6 | 3.98 | 5.19 | 5.18 | 11.68 |
| $B_2O_3$ | 8.61 | 0 | 7.44 | 0 | 0 | 0.85 | 4.69 |
| $Li_2O$ | 0 | 0 | 0 | 0 | 0 | 0 | 0 |
| $Na_2O$ | 7.05 | 9.83 | 8.02 | 10.86 | 11.72 | 10.49 | 12.03 |
| $K_2O$ | 1.05 | 0 | 0.01 | 0 | 0.01 | 0 | 0.01 |
| ZnO | 0 | 0.01 | 0.49 | 0 | 0 | 0.01 | 0 |
| MgO | 2.25 | 6.6 | 2.16 | 6.82 | 6.15 | 6.43 | 2.49 |
| CaO | 0.03 | 0.03 | 0.03 | 0.03 | 0.04 | 0.03 | 0.04 |
| SrO | 1.09 | 2.01 | 2.03 | 0 | 0.57 | 0 | 0 |
| BaO | 0 | 0 | 0 | 0 | 0 | 0 | 0 |
| $SnO_2$ | 0.08 | 0.07 | 0.08 | 0.08 | 0.09 | 0.08 | 0.1 |
| $R_2O/Al_2O_3$ | 1.07 | 1.91 | 1.06 | 2.73 | 2.26 | 2.03 | 1.03 |
| $(R_2O + RO)/Al_2O_3$ | 1.52 | 3.58 | 1.68 | 4.45 | 3.56 | 3.27 | 1.25 |
| $R_2O - Al_2O_3 - MgO$ | −1.72 | −1.93 | −1.73 | 0.06 | 0.39 | −1.12 | −2.13 |
| strain | 534 | 579 | 546 | 559 | 551 | 574 | 570 |
| anneal | 582 | 631 | 593 | 613 | 604 | 625 | 626 |
| soft | 846.6 | 884.8 | 835.8 | 872.1 | 854.1 | 878.8 | 913.3 |
| CTE | 56 | 63.2 | 55.500 | 65 | 69.5 | 63.3 | 68.6 |
| density | 2.351 | 2.43 | 2.396 | 2.375 | 2.398 | 2.38 | 2.382 |
| strain (bbv) | 529.1 | 577.5 | 541.1 | 556.1 | 549 | 573.2 | 567.8 |
| anneal (bbv) | 579.2 | 628.4 | 588.7 | 606.2 | 599.2 | 623.9 | 621.6 |
| last bbv visc | 616.2 | 12.0151 | 12.0045 | 12.0093 | 12.0064 | 12.0321 | 661.9 |
| last bbv T | 12.017 | 667.9 | 626 | 645.3 | 638.9 | 663.5 | 12.0021 |
| soft (ppv) | | | | | | | |
| Color shift | | 0.006504 | | | | 0.007294 | |
| Viscosity | | | | | | | |
| A | −1.929 | −1.989 | −1.876 | −2.061 | −2.032 | −1.911 | −3.038 |
| B | 6970.1 | 6434.3 | 6540.5 | 6732.8 | 6559.5 | 6471.3 | 8948.7 |

TABLE 5-continued

| | | | | | | | |
|---|---|---|---|---|---|---|---|
| To | 116.2 | 208.5 | 154.5 | 166.8 | 171.6 | 199.3 | 66.9 |
| T(200 P) | 1764 | 1708 | 1720 | 1710 | 1685 | 1736 | 1743 |
| 72 hr gradient boat | | | | | | | |
| int | 990 | 1005 | 950 | 980 | 945 | 1000 | 1050 |
| int liq visc | 1.12E+06 | 1.23E+06 | 2.22E+06 | 1.65E+06 | 2.81E+06 | 1.48E+06 | |

| | 64 | 65 | 66 | 67 | 68 | 69 | 70 |
|---|---|---|---|---|---|---|---|
| $SiO_2$ | 68.69 | 76.18 | 69.67 | 68.29 | 72.27 | 72.33 | 76.84 |
| $Al_2O_3$ | 10.07 | 4.37 | 9.7 | 10.78 | 7.66 | 7.7 | 4.69 |
| $B_2O_3$ | 9.12 | 0 | 7.44 | 7.35 | 7.61 | 7.6 | 0 |
| $Li_2O$ | 0 | 0 | 0 | 0 | 0 | 0 | 0 |
| $Na_2O$ | 9.44 | 8.94 | 9.54 | 10.17 | 7.95 | 8.12 | 11.68 |
| $K_2O$ | 0.56 | 1.19 | 0.05 | 0.26 | 0 | 0 | 0 |
| ZnO | 0 | 1.2 | 0 | 0 | 0 | 0 | 0 |
| MgO | 1.02 | 6.91 | 2.36 | 2.44 | 0 | 1.41 | 6.61 |
| CaO | 0.93 | 0.05 | 0.04 | 0.04 | 0.02 | 1.21 | 0.03 |
| SrO | 0 | 1.04 | 1.06 | 0.53 | 4.35 | 1.47 | 0 |
| BaO | 0 | 0 | 0 | 0 | 0 | 0 | 0 |
| $SnO_2$ | 0.1 | 0.1 | 0.07 | 0.08 | 0.07 | 0.08 | 0.1 |
| $R_2O/Al_2O_3$ | 0.99 | 2.32 | 0.99 | 0.97 | 1.04 | 1.05 | 2.49 |
| $(R_2O + RO)/Al_2O_3$ | 1.19 | 4.42 | 1.35 | 1.25 | 1.61 | 1.59 | 3.91 |
| $R_2O - Al_2O_3 - MgO$ | −1.09 | −1.15 | −2.47 | −2.79 | 0.29 | −0.99 | 0.38 |
| strain | 531 | 563 | 550 | 554 | 557 | 554 | 558 |
| anneal | 582 | 615 | 600 | 605 | 601 | 599 | 610 |
| soft | 859 | 871.5 | 878.8 | 881.1 | 814.2 | 834.4 | 862.2 |
| CTE | 62.5 | 66.2 | 60.4 | 63.5 | 57.1 | 55.7 | 68.3 |
| density | 2.343 | 2.428 | 2.376 | 2.369 | 2.454 | 2.382 | 2.386 |
| strain (bbv) | 52.4 | 562.2 | 543.8 | 547.1 | 551 | 548.3 | 555.7 |
| anneal (bbv) | 576.2 | 612.9 | 594.7 | 599.8 | 596.6 | 595.9 | 605.5 |
| last bbv visc | 613.2 | 12.0115 | 634.2 | 639 | 12.1873 | 12.1295 | 12.0229 |
| last bbv T | 12.0131 | 653.4 | 12.0044 | 12.0223 | 628.3 | 630.7 | 644.1 |
| soft (ppv) | | | | | | | |
| Color shift | | | | | | | |
| Viscosity | | | | | | | |
| A | −2.708 | −2.147 | −2.44 | −2.986 | −1.096 | −1.687 | −1.965 |
| B | 8488.2 | 6708.6 | 7713.5 | 8750.3 | 4896.4 | 6247.9 | 6387.6 |
| To | 36.4 | 179.5 | 100.1 | 55.9 | 259.3 | 178.2 | 187.4 |
| T(200 P) | 1731 | 1688 | 1727 | 1711 | 1701 | 1745 | 1685 |
| 72 hr gradient boat | | | | | | | |
| int | | 1000 | 1010 | 1020 | 920 | 930 | 915 |
| int liq visc | | 1.07E+06 | 1.09E+06 | 1.23E+06 | 2.07E+06 | 4.20E+06 | 6.52E+06 |

| | 71 | 72 | 73 | 74 | 75 | 76 | 77 |
|---|---|---|---|---|---|---|---|
| $SiO_2$ | 75.46 | 76.22 | 71.9 | 75.36 | 77.57 | 72.11 | 68.75 |
| $Al_2O_3$ | 5.78 | 4.95 | 8.56 | 6.98 | 4.15 | 7.71 | 10.1 |
| $B_2O_3$ | 1.88 | 0 | 1.93 | 0.85 | 0 | 7.64 | 7.36 |
| $Li_2O$ | 0 | 0 | 0 | 0 | 0 | 2.06 | 0 |
| $Na_2O$ | 10.75 | 9.84 | 12.43 | 12.28 | 10.5 | 6 | 9.41 |
| $K_2O$ | 0 | 0 | 0 | 0 | 0 | 0.01 | 0.56 |
| ZnO | 0 | 0 | 0 | 0 | 0.97 | 0 | 0 |
| MgO | 5.42 | 5.83 | 5.01 | 4.35 | 6.65 | 2.24 | 1.01 |
| CaO | 0.03 | 0.03 | 0.03 | 0.02 | 0.03 | 0.03 | 0.64 |
| SrO | 0.53 | 2.98 | 0 | 0 | 0 | 2.1 | 2.01 |
| BaO | 0.01 | 0 | 0 | 0 | 0 | 0 | 0 |
| $SnO_2$ | 0.08 | 0.07 | 0.11 | 0.11 | 0.09 | 0.08 | 0.09 |
| $R_2O/Al_2O_3$ | 1.86 | 1.99 | 1.45 | 1.76 | 2.53 | 1.05 | 0.99 |
| $(R_2O + RO)/Al_2O_3$ | 2.90 | 3.77 | 2.04 | 2.39 | 4.37 | 1.61 | 1.35 |
| $R_2O - Al_2O_3 - MgO$ | −0.45 | −0.94 | −1.14 | 0.95 | −0.3 | −1.88 | −1.14 |
| strain | 556 | 559 | 575 | 567 | 574 | 522 | 546 |
| anneal | 605 | 610 | 624 | 619 | 627 | 566 | 593 |
| soft | 849.3 | 858.6 | 876.6 | 874 | 878.3 | 804.2 | 64.4 |
| CTE | 64.6 | 65.5 | 71.3 | 69.9 | 63.6 | 51.7 | 834.7 |
| density | 2.403 | 2.457 | 2.403 | 2.393 | 2.393 | 2.384 | 2.415 |
| strain (bbv) | 551.8 | 557.3 | 568.9 | 563.8 | 573.5 | 515.1 | 539.5 |
| anneal (bbv) | 599.9 | 606.6 | 619.3 | 614 | 624.7 | 561.1 | 588 |
| last bbv visc | 12.0185 | 12.0236 | 12.0065 | 12.0047 | 12.0322 | 595.6 | 623.9 |
| last bbv T | 637.2 | 644.2 | 658.8 | 653.8 | 664.7 | 12.0044 | 12.0289 |
| soft (ppv) | | | | | | | |
| Color shift | | | | 0.006152 | | | |
| Viscosity | | | | | | | |
| A | −1.897 | −2.051 | −2.111 | −1.692 | −1.65 | −1.745 | −1.964 |
| B | 6438.4 | 6470.3 | 6794.6 | 6145 | 5771.2 | 6354.5 | 6613.2 |

TABLE 5-continued

| | | | | | | | |
|---|---|---|---|---|---|---|---|
| To | 174.3 | 184.4 | 177.5 | 205 | 242.7 | 133.1 | 150.8 |
| T(200 P) | 1708 | 1671 | 1718 | 1744 | 1703 | 1704 | 1701 |
| 72 hr gradient boat | | | | | | | |
| int | 935 | 955 | 1035 | 940 | 985 | 920 | 1010 |
| int liq visc | 3.69E+06 | 2.22E+06 | | | 1.33E+06 | | |

| | 78 | 79 | 80 | 81 | 82 | 83 | 84 |
|---|---|---|---|---|---|---|---|
| $SiO_2$ | 76.78 | 70.16 | 72.2 | 72.3 | 68.51 | 73.05 | 75.19 |
| $Al_2O_3$ | 5.14 | 8.97 | 7.66 | 7.19 | 10.74 | 7.5 | 3.98 |
| $B_2O_3$ | 0 | 7.22 | 7.61 | 7.53 | 6.43 | 5.62 | 0 |
| $Li_2O$ | 0.99 | 0 | 0 | 0 | 0 | 0 | 0 |
| $Na_2O$ | 10.52 | 10.47 | 8.05 | 8.05 | 10.77 | 8.72 | 12.83 |
| $K_2O$ | 0 | 0.01 | 0.01 | 0.01 | 0 | 0 | 0 |
| ZnO | 0.98 | 0 | 0.97 | 0.95 | 0 | 0 | 0 |
| MgO | 5.45 | 1.99 | 2.23 | 1.72 | 2.33 | 2.61 | 6.78 |
| CaO | 0.03 | 0.03 | 0.03 | 0.03 | 0.02 | 0.02 | 0.03 |
| SrO | 0 | 1.01 | 1.1 | 2.08 | 1.06 | 2.34 | 1.02 |
| BaO | 0 | 0 | 0 | 0 | 0 | 0 | 0.02 |
| $SnO_2$ | 0.1 | 0.08 | 0.08 | 0.07 | 0.07 | 0.08 | 0.1 |
| $R_2O/Al_2O_3$ | 2.24 | 1.17 | 1.05 | 1.12 | 1.00 | 1.16 | 3.22 |
| $(R_2O + RO)/Al_2O_3$ | 3.50 | 1.51 | 1.62 | 1.79 | 1.32 | 1.83 | 5.20 |
| $R_2O - Al_2O_3 - MgO$ | 0.92 | −0.48 | −1.83 | −0.85 | −2.3 | −1.39 | 2.07 |
| strain | 543 | 541 | 543 | 542 | 561 | 554 | 523 |
| anneal | 594 | 586 | 590 | 587 | 609 | 600 | 570 |
| soft | 853.9 | 822.3 | 846.3 | 823.3 | 866.2 | 837.9 | 805.2 |
| CTE | 67.3 | 63.6 | 54.8 | 55.1 | 65 | 58 | 74.7 |
| density | 2.401 | 2.389 | 2.376 | 2.407 | 2.393 | 2.414 | 2.424 |
| strain (bbv) | 539 | 533.9 | 535.6 | 535.6 | 554.1 | 547.6 | 517.3 |
| anneal (bbv) | 589.1 | 580.6 | 585.2 | 582.2 | 604.6 | 594.2 | 565.1 |
| last bbv visc | 12.007 | 614.9 | 12.003 | 12.0275 | 12.0335 | 12.025 | 12.0201 |
| last bbv T | 629.2 | 12.012 | 624 | 618.4 | 643.7 | 629.8 | 601.8 |
| soft (ppv) | | | | | | | |
| Color shift | | | | | | | |
| Viscosity | | | | | | | |
| A | −2.068 | −1.733 | −2.352 | −1.688 | −2.408 | −1.767 | −1.953 |
| B | 6741.8 | 6170.8 | 7658.8 | 6157.4 | 7567.5 | 6280.3 | 6035.8 |
| To | 150 | 165.5 | 90.3 | 169.2 | 119.5 | 174.2 | 169.6 |
| T(200 P) | 1693 | 1695 | 1736 | 1713 | 1727 | 1718 | 1588 |
| 72 hr gradient boat | | | | | | | |
| int | 905 | 930 | 1005 | 900 | 1030 | 970 | 855 |
| int liq visc | 7.27E+06 | 2.18E+06 | 1.05E+06 | 5.46E+06 | 8.01E+05 | 1.33E+06 | 7.13E+06 |

| | 85 | 86 | 87 | 88 | 89 | 90 | 91 |
|---|---|---|---|---|---|---|---|
| $SiO_2$ | 77.19 | 77.19 | 75.21 | 76.84 | 75.88 | 75.15 | 70.89 |
| $Al_2O_3$ | 4.14 | 3.97 | 4.96 | 4.89 | 4.44 | 6.95 | 8.6 |
| $B_2O_3$ | 0 | 0 | 0 | 0 | 0 | 0 | 7.41 |
| $Li_2O$ | 0 | 0 | 0 | 0 | 0 | 0 | 0 |
| $Na_2O$ | 10.81 | 9.87 | 10.83 | 10.89 | 9.27 | 10.84 | 9.4 |
| $K_2O$ | 0 | 0 | 0 | 0 | 1.54 | 0 | 0 |
| ZnO | 1.07 | 0 | 0 | 1.18 | 1.48 | 0 | 0 |
| MgO | 6.19 | 6.8 | 5.84 | 6.04 | 7.23 | 3.87 | 2 |
| CaO | 0.03 | 0.03 | 0.03 | 0.03 | 0.03 | 0.03 | 0.02 |
| SrO | 0 | 1.99 | 2.97 | 0 | 0 | 2.98 | 1.52 |
| BaO | 0.45 | 0 | 0 | 0 | 0 | 0.04 | 0 |
| $SnO_2$ | 0.09 | 0.08 | 0.07 | 0.09 | 0.1 | 0.09 | 0.08 |
| $R_2O/Al_2O_3$ | 2.61 | 2.49 | 2.18 | 2.23 | 2.43 | 1.56 | 1.09 |
| $(R_2O + RO)/Al_2O_3$ | 4.48 | 4.71 | 3.97 | 3.71 | 4.40 | 2.56 | 1.50 |
| $R_2O - Al_2O_3 - MgO$ | 0.48 | −0.9 | 0.03 | −0.04 | −0.86 | 0.02 | −1.2 |
| strain | 558 | 554 | 547 | 577 | 572 | 572 | 550 |
| anneal | 611 | 606 | 596 | 630 | 626 | 623 | 596 |
| soft | 861.2 | 857.7 | 835.8 | 885.7 | 887.5 | 868.7 | 836.0 |
| CTE | 66.7 | 63.9 | 69 | 65 | 67.9 | 68.1 | 60.7 |
| density | 2.419 | 2.429 | 2.466 | 2.402 | 2.414 | 2.462 | 2.387 |
| strain (bbv) | 558.8 | 551.6 | 544.3 | 572.4 | 571.1 | 567.8 | 544.3 |
| anneal (bbv) | 608.8 | 600.3 | 591.4 | 622.5 | 623.3 | 617.5 | 591.9 |
| last bbv visc | 12.0023 | 12.0263 | 12.0281 | 12.0188 | 12.037 | 12.0284 | 12.009 |
| last bbv T | 648.8 | 637.9 | 627.9 | 661.8 | 663.9 | 656.6 | 629.2 |
| soft (ppv) | | | | | | | |
| Color shift | | | | | | | |
| Viscosity | | | | | | | |
| A | −1.945 | −2.106 | −1.972 | −2.098 | −2.098 | −1.83 | −1.711 |
| B | 6306.1 | 6632.1 | 6181.9 | 6646.1 | 6561.3 | 6211.1 | 6180.4 |

TABLE 5-continued

| | | | | | | | |
|---|---|---|---|---|---|---|---|
| To | 196.6 | 168.5 | 186.2 | 190.9 | 199.6 | 208.2 | 178.3 |
| T(200 P) | 1682 | 1673 | 1633 | 1702 | 1691 | 1712 | 1719 |
| 72 hr gradient boat | | | | | | | |
| int | 935 | 1005 | 930 | 955 | 1075 | 1000 | 940 |
| int liq visc | 3.94E+06 | 6.64E+05 | 2.18E+06 | 3.98E+06 | 2.50E+05 | 1.03E+06 | 2.53E+06 |

| | 92 | 93 | 94 | 95 | 96 | 97 | 98 |
|---|---|---|---|---|---|---|---|
| $SiO_2$ | 69.36 | 76.39 | 77.22 | 75.2 | 72.91 | 73.37 | 76.39 |
| $Al_2O_3$ | 9.74 | 5.17 | 6.93 | 6.95 | 7.8 | 7.06 | 5.18 |
| $B_2O_3$ | 7.05 | 0 | 0 | 0 | 2.58 | 5.63 | 0 |
| $Li_2O$ | 0 | 0 | 0 | 0 | 0 | 0 | 0.96 |
| $Na_2O$ | 10.88 | 11.65 | 10.78 | 8.87 | 11.5 | 8.94 | 10.84 |
| $K_2O$ | 0 | 0 | 0 | 0 | 0 | 0 | 0 |
| ZnO | 0 | 0 | 0 | 0 | 0 | 0.01 | 0 |
| MgO | 1.91 | 6.11 | 1.95 | 3.88 | 5.03 | 3.3 | 6.47 |
| CaO | 0.9 | 0.03 | 0.03 | 0.03 | 0.03 | 0.03 | 0.03 |
| SrO | 0 | 0.51 | 2.96 | 4.92 | 0 | 1.56 | 0 |
| BaO | 0 | 0 | 0 | 0 | 0 | 0 | 0 |
| $SnO_2$ | 0.08 | 0.1 | 0.07 | 0.07 | 0.1 | 0.08 | 0.1 |
| $R_2O/Al_2O_3$ | 1.12 | 2.25 | 1.56 | 1.28 | 1.47 | 1.27 | 2.28 |
| $(R_2O + RO)/Al_2O_3$ | 1.41 | 3.54 | 2.27 | 2.55 | 2.12 | 1.96 | 3.53 |
| $R_2O - Al_2O_3 - MgO$ | −0.77 | 0.37 | 1.9 | −1.96 | −1.33 | −1.42 | 0.15 |
| strain | 547 | 556 | 560 | 590 | 562 | 556 | 542 |
| anneal | 594 | 608 | 611 | 641 | 611 | 602 | 593 |
| soft | 844.3 | 859.0 | 863.6 | 892.5 | 862.5 | 838 | 851.4 |
| CTE | 65.3 | 69.1 | 67.4 | 63.7 | 67.1 | 59 | 67.5 |
| density | 2.371 | 2.4 | 2.448 | 2.503 | 2.393 | 2.397 | 2.388 |
| strain (bbv) | 542.4 | 553.9 | 555.8 | 587.8 | 555.8 | 551.1 | 535.5 |
| anneal (bbv) | 590.1 | 602.6 | 605.6 | 637.8 | 605.8 | 597.7 | 586.9 |
| last bbv visc | 12.0344 | 12.0062 | 12.0251 | 12.0153 | 12.0306 | 12.0236 | 12.0311 |
| last bbv T | 627.1 | 641 | 644.4 | 676.7 | 643.8 | 633.9 | 626.3 |
| soft (ppv) | | | | | | | |
| Color shift | | | | | | 0.007476 | |
| Viscosity | | | | | | | |
| A | −1.969 | −1.99 | −1.703 | −1.899 | −2.078 | −1.901 | −1.995 |
| B | 6660.4 | 6544.9 | 6317.9 | 6249.2 | 6854.1 | 6483.7 | 6573.3 |
| To | 151.2 | 173.3 | 184.1 | 227.5 | 157.9 | 168.1 | 157.5 |
| T(200 P) | 1711 | 1699 | 1762 | 1715 | 1723 | 1711 | 1688 |
| 72 hr gradient boat | | | | | | | |
| int | 950 | 945 | 970 | 1030 | 1035 | 955 | 955 |
| int liq visc | 2.34E+06 | 3.10E+06 | 2.17E+06 | 7.73E+05 | | 2.18E+06 | 1.77E+06 |

| | 99 | 100 | 101 | 102 | 103 | 104 | 105 |
|---|---|---|---|---|---|---|---|
| $SiO_2$ | 75.12 | 69.44 | 77.42 | 72.76 | 76.17 | 70.67 | 75.99 |
| $Al_2O_3$ | 6.97 | 9.75 | 3.94 | 5.01 | 4.35 | 8.25 | 4.61 |
| $B_2O_3$ | 0 | 6.48 | 0 | 8.32 | 0 | 8.43 | 0 |
| $Li_2O$ | 0 | 0 | 0 | 0 | 0 | 0 | 0 |
| $Na_2O$ | 12.81 | 10.79 | 9.86 | 4.14 | 8.56 | 7.12 | 11.25 |
| $K_2O$ | 0 | 0 | 0 | 0.97 | 1.58 | 1.04 | 0 |
| ZnO | 0 | 0 | 0.97 | 0 | 1.2 | 0 | 1.47 |
| MgO | 3.93 | 2.31 | 6.64 | 4.31 | 6.92 | 2.22 | 6.51 |
| CaO | 0.03 | 0.02 | 0.03 | 0.05 | 0.05 | 0.04 | 0.03 |
| SrO | 1 | 1.06 | 1 | 4.27 | 1.04 | 2.08 | 0 |
| BaO | 0 | 0 | 0 | 0 | 0 | 0 | 0 |
| $SnO_2$ | 0.07 | 0.07 | 0.09 | 0.09 | 0.09 | 0.07 | 0.1 |
| $R_2O/Al_2O_3$ | 1.84 | 1.11 | 2.50 | 1.02 | 2.33 | 0.99 | 2.44 |
| $(R_2O + RO)/Al_2O_3$ | 2.55 | 1.45 | 4.70 | 2.74 | 4.45 | 1.52 | 4.18 |
| $R_2O - Al_2O_3 - MgO$ | 1.91 | −1.27 | −0.72 | −4.21 | −1.13 | −2.31 | 0.13 |
| strain | 555 | 555 | 573 | 560 | 562 | 540 | 569 |
| anneal | 603 | 600 | 624 | 604 | 614 | 586 | 622 |
| soft | 852.6 | 842.0 | 878.3 | 831.7 | 873.4 | 834.9 | 880.4 |
| CTE | 72.9 | 65.1 | 61.9 | 49.6 | 67.6 | 57.7 | 66.7 |
| density | 2.42 | 2.394 | 2.416 | 2.433 | 2.428 | 2.387 | 2.414 |
| strain (bbv) | 549 | 547.5 | 565.6 | 556.7 | 558.9 | 535.2 | 565.7 |
| anneal (bbv) | 598.3 | 595.7 | 616.3 | 605.8 | 610.7 | 583.8 | 616.4 |
| last bbv visc | 12.032 | 12.0213 | 12.0121 | 641.9 | 12.014 | 619.5 | 12.016 |
| last bbv T | 636.5 | 633.4 | 655.5 | 12.0273 | 651.5 | 12.0244 | 656 |
| soft (ppv) | | | | | | | |
| Color shift | | | 0.005265 | | | | |
| Viscosity | | | | | | | |
| A | −1.844 | −1.974 | −2.029 | −1.718 | −2.199 | −1.884 | −1.992 |
| B | 6349.3 | 6617.5 | 6515.2 | 5894.9 | 6826.5 | 6635.5 | 6312 |

TABLE 5-continued

| | | | | | | | |
|---|---|---|---|---|---|---|---|
| To | 178.9 | 160.3 | 191.4 | 212.6 | 171.2 | 142.2 | 205.3 |
| T(200 P) | 1711 | 1708 | 1696 | 1679 | 1688 | 1728 | 1676 |
| 72 hr gradient boat | | | | | | | |
| int | 970 | 970 | 1015 | 1000 | 970 | 935 | 960 |
| int liq visc | 1.52E+06 | 1.58E+06 | 7.61E+05 | | 2.22E+06 | 3.06E+06 | 2.35E+06 |

| | 106 | 107 | 108 | 109 | 110 | 111 | 112 |
|---|---|---|---|---|---|---|---|
| $SiO_2$ | 77.22 | 67.94 | 75.19 | 76.35 | 75.87 | 76.28 | 77.09 |
| $Al_2O_3$ | 3.96 | 10.68 | 6.93 | 5.21 | 4 | 4.89 | 3.98 |
| $B_2O_3$ | 0 | 7.19 | 0 | 0 | 0 | 0 | 0 |
| $Li_2O$ | 0 | 0 | 0 | 0 | 0 | 0 | 0 |
| $Na_2O$ | 10.91 | 10.88 | 10.81 | 11.55 | 9.7 | 11.24 | 10.88 |
| $K_2O$ | 0 | 0.01 | 0 | 0.01 | 0 | 0 | 0 |
| ZnO | 0.97 | 0 | 0 | 0 | 2.48 | 1.21 | 0 |
| MgO | 6.77 | 2.32 | 1.95 | 5.67 | 6.78 | 6.23 | 6.85 |
| CaO | 0.03 | 0.04 | 0.03 | 0.07 | 0.03 | 0.03 | 0.03 |
| SrO | 0 | 0.81 | 4.96 | 1.01 | 1.01 | 0 | 1.03 |
| BaO | 0 | 0 | 0 | 0 | 0 | 0 | 0 |
| $SnO_2$ | 0.09 | 0.07 | 0.07 | 0.1 | 0.1 | 0.09 | 0.1 |
| $R_2O/Al_2O_3$ | 2.76 | 1.02 | 1.56 | 2.22 | 2.43 | 2.30 | 2.73 |
| $(R_2O + RO)/Al_2O_3$ | 4.72 | 1.32 | 2.56 | 3.51 | 5.00 | 3.83 | 4.72 |
| $R_2O - Al_2O_3 - MgO$ | 0.18 | -2.11 | 1.93 | 0.68 | -1.08 | 0.12 | 0.05 |
| strain | 566 | 547 | 555 | 547 | 575 | 571 | 549 |
| anneal | 618 | 596 | 603 | 598 | 626 | 625 | 599 |
| soft | 874 | 856.8 | 839 | 852 | 873.3 | 877.4 | 847.3 |
| CTE | 65.4 | 65.2 | 70.7 | 70 | 62.7 | 67.4 | 66.5 |
| density | 2.396 | 2.386 | 2.507 | 2.408 | 2.454 | 2.406 | 2.403 |
| strain (bbv) | 567.1 | 542 | 548.3 | 545.6 | 573.4 | 568.4 | 544.9 |
| anneal (bbv) | 617.3 | 591.2 | 596.8 | 595.1 | 623.5 | 619.7 | 593.9 |
| last bbv visc | 12.0035 | 627.7 | 12.0071 | 12.0146 | 12.0268 | 12.032 | 12.039 |
| last bbv T | 657 | 12.006 | 634.3 | 634.2 | 662.9 | 659.1 | 631.4 |
| soft (ppv) | | | | | | | |
| Color shift | 0.004932 | | | | | | |
| Viscosity | | | | | | | |
| A | -1.856 | -2.605 | -1.587 | -1.876 | -1.874 | -2.588 | -1.976 |
| B | 6077.3 | 7862.2 | 5648.3 | 6262.9 | 5984 | 7841.8 | 6357.2 |
| To | 218.4 | 89.5 | 218.6 | 183.2 | 232.3 | 83.7 | 177.7 |
| T(200 P) | 1680 | 1692 | 1671 | 1683 | 1666 | 1688 | 1664 |
| 72 hr gradient boat | | | | | | | |
| int | 960 | 975 | 990 | 945 | 1055 | 945 | 950 |
| int liq visc | 2.18E+06 | 1.88E+06 | 5.43E+05 | 2.21E+06 | 2.51E+05 | 3.29E+06 | 1.80E+06 |

| | 113 | 114 | 115 | 116 | 117 | 118 | 119 |
|---|---|---|---|---|---|---|---|
| $SiO_2$ | 69.17 | 72.45 | 77.4 | 74.55 | 72.35 | 75.95 | 73.14 |
| $Al_2O_3$ | 8.97 | 7.6 | 4.14 | 6.83 | 7.63 | 4.49 | 7.05 |
| $B_2O_3$ | 7.25 | 7.44 | 0 | 7.75 | 8.03 | 0 | 5.84 |
| $Li_2O$ | 0 | 0 | 0 | 0 | 0 | 0 | 0 |
| $Na_2O$ | 10.45 | 8.04 | 10.85 | 6.77 | 7.47 | 10.18 | 8.94 |
| $K_2O$ | 0.01 | 0 | 0 | 0.01 | 0.01 | 0 | 0 |
| ZnO | 0 | 0 | 0.97 | 0 | 0 | 1.09 | 0 |
| MgO | 2.95 | 0 | 5.99 | 1.95 | 2.23 | 7.02 | 3.29 |
| CaO | 0.04 | 0.02 | 0.03 | 0.04 | 0.03 | 0.03 | 0.03 |
| SrO | 1.01 | 0 | 0.5 | 1.95 | 2.09 | 1.11 | 1.57 |
| BaO | 0 | 4.3 | 0 | 0 | 0 | 0 | 0.02 |
| $SnO_2$ | 0.08 | 0.08 | 0.09 | 0.09 | 0.07 | 0.1 | 0.08 |
| $R_2O/Al_2O_3$ | 1.17 | 1.06 | 2.62 | 0.99 | 0.98 | 2.27 | 1.27 |
| $(R_2O + RO)/Al_2O_3$ | 1.61 | 1.63 | 4.43 | 1.57 | 1.55 | 4.33 | 1.96 |
| $R_2O - Al_2O_3 - MgO$ | -1.46 | 0.44 | 0.72 | -2 | -2.38 | -1.33 | -1.4 |
| strain | 541 | 559 | 561 | 547 | 547 | 573 | 552 |
| anneal | 586 | 601 | 612 | 598 | 595 | 624 | 597 |
| soft | 825 | 801.3 | 870.6 | 861.6 | 854.2 | 876.9 | 838.1 |
| CTE | 63.9 | 58.8 | 65.3 | 49.8 | 53 | 63.8 | 58.2 |
| density | 2.396 | 2.530 | 2.407 | 2.361 | 2.378 | 2.432 | 2.402 |
| strain (bbv) | 535.1 | 552.1 | 557.4 | 544.8 | 541.6 | 572.4 | 543.1 |
| anneal (bbv) | 581.6 | 597 | 607.5 | 593.9 | 590.2 | 622.5 | 589.6 |
| last bbv visc | 615.2 | 12.1676 | 12.0084 | 630.3 | 627.9 | 12.0276 | 12.0186 |
| last bbv T | 12.0429 | 628.8 | 647 | 12.0077 | 12.0224 | 662 | 625.5 |
| soft (ppv) | | | | | | | |
| Color shift | | | 0.004576 | | | | |
| Viscosity | | | | | | | |
| A | -1.784 | -0.961 | -1.889 | -2.1 | -2.075 | -2.016 | -1.808 |
| B | 6176.7 | 4553 | 6216.6 | 7434.6 | 7048 | 6405.8 | 6390.8 |

TABLE 5-continued

| | | | | | | | |
|---|---|---|---|---|---|---|---|
| To | 168.2 | 281.5 | 199.6 | 105.8 | 127.6 | 205.8 | 163 |
| T(200 P) | 1680 | 1677 | 1683 | 1795 | 1738 | 1690 | 1718 |
| 72 hr gradient boat | | | | | | | |
| int | 940 | 875 | 950 | 945 | 970 | 1015 | 985 |
| int liq visc | 1.66E+06 | 5.13E+06 | 2.49E+06 | 5.74E+06 | 1.96E+06 | 7.95E+05 | 9.26E+05 |

| | 120 | 121 | 122 | 123 | 124 | 125 | 126 |
|---|---|---|---|---|---|---|---|
| $SiO_2$ | 72.43 | 72.05 | 70.11 | 70.93 | 72.09 | 76.38 | 73.24 |
| $Al_2O_3$ | 7.63 | 7.49 | 9.14 | 8.67 | 8.71 | 5.17 | 6.95 |
| $B_2O_3$ | 7.47 | 7.41 | 7.31 | 7.52 | 7.69 | 0 | 0 |
| $Li_2O$ | 0 | 0 | 0 | 0 | 1.23 | 0 | 0 |
| $Na_2O$ | 8.04 | 7.93 | 10.11 | 8.79 | 7.86 | 11.16 | 12.77 |
| $K_2O$ | 0 | 0.01 | 0 | 0.01 | 0.01 | 0 | 0 |
| ZnO | 0 | 0.96 | 0 | 0 | 0 | 0 | 0 |
| MgO | 0.04 | 2.04 | 1.95 | 2.32 | 1.22 | 6.6 | 3.9 |
| CaO | 4.24 | 0.03 | 0.02 | 0.04 | 0.02 | 0.03 | 0.03 |
| SrO | 0 | 1.92 | 1.21 | 1.57 | 1.06 | 0.51 | 2.98 |
| BaO | 0 | 0 | 0 | 0 | 0 | 0 | 0 |
| $SnO_2$ | 0.08 | 0.08 | 0.07 | 0.08 | 0.08 | 0.1 | 0.07 |
| $R_2O/Al_2O_3$ | 1.05 | 1.06 | 1.11 | 1.01 | 1.04 | 2.16 | 1.84 |
| $(R_2O + RO)/Al_2O_3$ | 1.61 | 1.72 | 1.45 | 1.47 | 1.31 | 3.54 | 2.83 |
| $R_2O - Al_2O_3 - MgO$ | 0.37 | −1.59 | −0.98 | −2.19 | −0.83 | −0.61 | 1.92 |
| strain | 565 | 543 | 549 | 549 | 522 | 566 | 543 |
| anneal | 608 | 589 | 595 | 596 | 569 | 619 | 590 |
| soft | 834.5 | 835.2 | 833.1 | 859.5 | 831.8 | 873.9 | 824 |
| CTE | 56.5 | 54.3 | 62.6 | 58.2 | 55.8 | 67.5 | 75.7 |
| density | 2.372 | 2.401 | 2.386 | 2.382 | 2.357 | 2.399 | 2.48 |
| strain (bbv) | 559.6 | 538 | 590 | 542.5 | 523 | 564.2 | 539.7 |
| anneal (bbv) | 507.4 | 585.8 | 541.9 | 591.4 | 571.6 | 614.5 | 586.7 |
| last bbv visc | 12.2374 | 12.0134 | 12.0101 | 629.2 | 609.5 | 12.0077 | 12.0222 |
| last bbv T | 639.1 | 623.1 | 627.4 | 12.0272 | 12.0178 | 653.6 | 623.6 |
| soft (ppv) | | | | | | | |
| Color shift | | | | | | | |
| Viscosity | | | | | | | |
| A | 71.14 | −1.928 | −1.78 | −2.072 | −1.893 | −2.035 | −1.734 |
| B | 5209.2 | 6686.9 | 6250.3 | 6986.5 | 6912 | 6543 | 5749.3 |
| To | 253.5 | 143.2 | 173.7 | 133.5 | 112.3 | 187.6 | 205.4 |
| T(200 P) | 1704 | 1724 | 1705 | 1731 | 1760 | 1697 | 1630 |
| 72 hr gradient boat | | | | | | | |
| int | 980 | 935 | 950 | 980 | 910 | 950 | 970 |
| int liq visc | 7.59E+05 | 3.29E+06 | 1.87E+06 | 1.52E+06 | 5.91E+06 | 3.52E+06 | 6.10E+05 |

| | 127 | 128 | 129 | 130 | 131 | 132 | 133 |
|---|---|---|---|---|---|---|---|
| $SiO_2$ | 77.49 | 75.95 | 77.67 | 76.16 | 76.23 | 77.56 | 76.37 |
| $Al_2O_3$ | 4.68 | 4.91 | 4.34 | 4.36 | 4.37 | 3.96 | 5.18 |
| $B_2O_3$ | 0 | 0 | 0 | 0 | 0 | 0 | 0 |
| $Li_2O$ | 0 | 0 | 0 | 0 | 0 | 0 | 0 |
| $Na_2O$ | 10.76 | 11.24 | 10.74 | 9.58 | 8.32 | 9.33 | 11.66 |
| $K_2O$ | 0 | 0 | 0 | 0.58 | 1.75 | 1.46 | 0 |
| ZnO | 0.97 | 1.48 | 0.97 | 1.2 | 1.18 | 0 | 0 |
| MgO | 5.94 | 6.25 | 5.88 | 6.89 | 6.94 | 6.75 | 6.61 |
| CaO | 0.03 | 0.03 | 0.03 | 0.05 | 0.05 | 0.03 | 0.03 |
| SrO | 0 | 0 | 0.25 | 1.05 | 1.02 | 0.79 | 0 |
| BaO | 0 | 0 | 0 | 0 | 0 | 0 | 0 |
| $SnO_2$ | 0.09 | 0.1 | 0.09 | 0.1 | 0.09 | 0.09 | 0.01 |
| $R_2O/Al_2O_3$ | 2.30 | 2.29 | 2.47 | 2.33 | 2.30 | 2.72 | 2.25 |
| $(R_2O + RO)/Al_2O_3$ | 3.78 | 3.87 | 4.12 | 4.44 | 4.41 | 4.64 | |
| $R_2O - Al_2O_3 - MgO$ | 0.14 | 0.08 | 0.52 | −1.09 | −1.24 | 0.08 | |
| strain | 575 | 573 | 568 | 566 | 564 | 548 | 565 |
| anneal | 628 | 626 | 621 | 616 | 616 | 601 | 618 |
| soft | 886.8 | 883.3 | 876.7 | 868.1 | 878.9 | 858.1 | 874.7 |
| CTE | 64.8 | 66.4 | 64.9 | 64.9 | 66.9 | 68.4 | 69 |
| density | 2.394 | 2.413 | 2.398 | 2.428 | 2.426 | 2.399 | 2.388 |
| strain (bbv) | 572.5 | 571.9 | 564.8 | 561.9 | 561.7 | 546.5 | 564.6 |
| anneal (bbv) | 624.8 | 621.8 | 616.6 | 612.5 | 613.3 | 598.2 | 614.8 |
| last bbv visc | 12.0168 | 12.0291 | 12.0234 | 12.0218 | 12.0076 | 12.0149 | 12.0076 |
| last bbv T | 665.4 | 660.4 | 656.4 | 652.5 | 654.2 | 638.3 | 654 |
| soft (ppv) | | | | | | | |
| Color shift | 0.005485 | | | | | | |
| Viscosity | | | | | | | |
| A | −1.869 | −1.867 | −1.804 | −2.03 | −2.074 | −1.966 | −1.989 |
| B | 6229.9 | 6132.6 | 6165.5 | 6430.3 | 6603.1 | 6524.4 | 6450.8 |

TABLE 5-continued

| To | 216.6 | 219.2 | 210.5 | 194.8 | 185.3 | 171.6 | 192.9 |
|---|---|---|---|---|---|---|---|
| T(200 P) | 1711 | 1691 | 1712 | 1680 | 1695 | 1701 | 1697 |
| 72 hr gradient boat | | | | | | | |
| int | 955 | 970 | 955 | 990 | 990 | 880 | 935 |
| int liq visc | 3.70E+06 | 2.00E+06 | 3.00E+06 | 1.14E+06 | 1.35E+06 | 1.75E+07 | 5.05E+06 |

Additional examples can include the following compositions in mol %:

| | | | | | | | |
|---|---|---|---|---|---|---|---|
| $SiO_2$ | 71.86 | 73 | 63-81 | 64-80 | 68-75 | 67 | 71 |
| $Al_2O_3$ | 0.08 | 0.05 | 0-2 | 0-5 | 0-3 | 0 | 0.09 |
| MgO | 5.64 | 0.22 | 0-6 | 0-10 | 2-6 | 14 | 6 |
| CaO | 9.23 | 10.9 | 7-14 | 2-15 | 6-11 | 6 | 9 |
| SrO | 0.00 | 0.23 | 0-2 | | | | |
| $Li_2O$ or $Li_2O_5$ | 0.00 | 0.002 | 0-2 | | | | |
| $Na_2O$ | 13.13 | 14.91 | 9-15 | 9-18 | 11-15 | 13 | 13 |
| $K_2O$ | 0.02 | 0.012 | 0-1.5 | 0-5 | 0-3 | 0.02 | 0.02 |
| $Fe_2O_3$ | 0.04 | 0.016 | 0-0.6 | | | | |
| $Cr_2O_3$ | 0.00 | 0.00 | 0-0.2 | | | | |
| $MnO_2$ | 0.00 | 0.00 | 0-0.2 | | | | |
| $Co_3O_4$ | 0.00 | 0.00 | 0-0.1 | | | | |
| $TiO_2$ | 0.01 | 0.008 | 0-0.8 | | | | |
| $SO_3$ | 0.00 | 0.078 | 0-0.2 | 0-05-0.4 | 0.1-0.4 | | |
| Se | 0.00 | 0.00 | 0-0.1 | | | | |

As noted in the above tables an exemplary glass article in some embodiments can comprise a glass which comprises: between about 65.79 mol % to about 78.17 mol % $SiO_2$, between about 2.94 mol % to about 12.12 mol % $Al_2O_3$, between about 0 mol % to about 11.16 mol % $B_2O_3$, between about 0 mol % to about 2.06 mol % $Li_2O$, between about 3.52 mol % to about 13.25 mol % $Na_2O$, between about 0 mol % to about 4.83 mol % $K_2O$, between about 0 mol % to about 3.01 mol % ZnO, between about 0 mol % to about 8.72 mol % MgO, between about 0 mol % to about 4.24 mol % CaO, between about 0 mol % to about 6.17 mol % SrO, between about 0 mol % to about 4.3 mol % BaO, and between about 0.07 mol % to about 0.11 mol % $SnO_2$. In some embodiments, the glass article comprises a color shift <0.008. In some embodiments, the glass article comprises a color shift <0.005. In some embodiments, the glass article comprises an $R_xO/Al_2O_3$ between 0.95 and 3.23, wherein R is any one or more of Li, Na, K, Rb, Cs and x is 2. In some embodiments, the glass article comprises an $R_xO/Al_2O_3$ between 1.18 and 5.68, wherein R is any one or more of Li, Na, K, Rb, Cs and x is 2, or Zn, Mg, Ca, Sr or Ba and x is 1. In some embodiments, the glass article comprises an $R_xO—Al_2O_3—MgO$ between −4.25 and 4.0, wherein R is any one or more of Li, Na, K, Rb, Cs and x is 2. In some embodiments, the glass has a strain temperature between about 522° C. and 590° C. In some embodiments, the glass has an annealing temperature between about 566° C. and 641° C. In some embodiments, the glass has a softening temperature between about 800° C. and 914° C. In some embodiments, the glass has a CTE between about 49.6×10-7/° C. to about 80×10-7/° C. In some embodiments, the glass has a density between about 2.34 gm/cc @ 20° C. and about 2.53 gm/cc @ 20° C. In some embodiments, the glass article is a light guide plate. In some embodiments, the thickness of the plate is between about 0.2 mm and about 8 mm. In some embodiments, the thickness has a variation of less than 5%. In some embodiments, the light guide plate is manufactured from a fusion draw process, slot draw process, or a float process. In some embodiments, the glass comprises less than 1 ppm each of Co, Ni, and Cr. In some embodiments, the concentration of Fe is <about 50 ppm, <about 20 ppm, or <about 10 ppm. In some embodiments, Fe+30Cr+35Ni <about 60 ppm, <about 40 ppm, <about 20 ppm, or <about 10 ppm. In some embodiments, the transmittance at 450 nm with at least 500 mm in length is greater than or equal to 85%, the transmittance at 550 nm with at least 500 mm in length is greater than or equal to 90%, or the transmittance at 630 nm with at least 500 mm in length is greater than or equal to 85%, and combinations thereof. In some embodiments, the glass is chemically strengthened. In further embodiments, the glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional embodiments, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

In further embodiments, a glass article is provided comprising a glass which comprises: between about 66 mol % to about 78 mol % $SiO_2$, between about 4 mol % to about 11 mol % $Al_2O_3$, between about 4 mol % to about 11 mol % $B_2O_3$, between about 0 mol % to about 2 mol % $Li_2O$, between about 4 mol % to about 12 mol % $Na_2O$, between about 0 mol % to about 2 mol % $K_2O$, between about 0 mol % to about 2 mol % ZnO, between about 0 mol % to about 5 mol % MgO, between about 0 mol % to about 2 mol % CaO, between about 0 mol % to about 5 mol % SrO, between about 0 mol % to about 2 mol % BaO, and between about 0 mol % to about 2 mol % $SnO_2$. In some embodiments, the glass article comprises a color shift <0.008. In some embodiments, the glass article comprises a color shift <0.005. In some embodiments, the glass article comprises an $R_xO/Al_2O_3$ between 0.95 and 3.23, wherein R is any one or more of Li, Na, K, Rb, Cs and x is 2. In some embodiments, the glass article comprises an $R_xO/Al_2O_3$ between 1.18 and 5.68, wherein R is any one or more of Li, Na, K, Rb, Cs and x is 2, or Zn, Mg, Ca, Sr or Ba and x is 1. In some embodiments, the glass article comprises an $R_xO—Al_2O_3—MgO$ between −4.25 and 4.0, wherein R is any one or more of Li, Na, K, Rb, Cs and x is 2. In some embodiments, the glass has a strain temperature between about 522° C. and 590° C. In some embodiments, the glass has an annealing temperature between about 566° C. and 641° C. In some embodiments, the glass has a softening temperature between about 800° C. and 914° C. In some embodiments, the glass has a CTE between about 49.6×10-7/° C. to about 80×10-7/° C. In some embodiments, the glass has a density between about 2.34 gm/cc @ 20° C. and about 2.53 gm/cc @ 20° C. In some embodiments, the glass article is a light guide plate. In some embodiments, the thickness of the plate is between about 0.2 mm and about 8 mm. In some embodiments, the thickness has a variation of less than 5%. In some embodiments, the light guide plate is manufactured from a fusion draw process, slot draw process, or a float process. In some embodiments, the glass comprises less than 1 ppm each of Co, Ni, and Cr. In some embodiments, the concentration of Fe is <about 50 ppm, <about 20 ppm, or <about 10 ppm. In some embodiments, Fe+30Cr+35Ni <about 60 ppm, <about 40 ppm, <about 20 ppm, or <about 10 ppm. In some embodiments, the transmittance at 450 nm with at least 500 mm in length is greater than or equal to 85%, the transmittance at 550 nm with at least 500 mm in length is greater than or equal to 90%, or the transmittance at 630 nm with at least 500 mm in length is greater than or equal to 85%, and combinations thereof. In some embodiments, the glass is chemically strengthened. In further embodiments, the glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional embodiments, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

In additional embodiments, a glass article is provided comprising a glass which comprises: between about 72 mol % to about 80 mol % $SiO_2$, between about 3 mol % to about 7 mol % $Al_2O_3$, between about 0 mol % to about 2 mol % $B_2O_3$, between about 0 mol % to about 2 mol % $Li_2O$, between about 6 mol % to about 15 mol % $Na_2O$, between about 0 mol % to about 2 mol % $K_2O$, between about 0 mol % to about 2 mol % ZnO, between about 2 mol % to about 10 mol % MgO, between about 0 mol % to about 2 mol % CaO, between about 0 mol % to about 2 mol % SrO, between about 0 mol % to about 2 mol % BaO, and between about 0 mol % to about 2 mol % $SnO_2$. In some embodiments, the glass article comprises a color shift <0.008. In some embodiments, the glass article comprises a color shift <0.005. In some embodiments, the glass article comprises an $R_xO/Al_2O_3$ between 0.95 and 3.23, wherein R is any one or more of Li, Na, K, Rb, Cs and x is 2. In some embodiments, the glass article comprises an $R_xO/Al_2O_3$ between 1.18 and 5.68, wherein R is any one or more of Li, Na, K, Rb, Cs and x is 2, or Zn, Mg, Ca, Sr or Ba and x is 1. In some embodiments, the glass article comprises an $R_xO$—$Al_2O_3$—MgO between −4.25 and 4.0, wherein R is any one or more of Li, Na, K, Rb, Cs and x is 2. In some embodiments, the glass has a strain temperature between about 522° C. and 590° C. In some embodiments, the glass has an annealing temperature between about 566° C. and 641° C. In some embodiments, the glass has a softening temperature between about 800° C. and 914° C. In some embodiments, the glass has a CTE between about 49.6×10-7/° C. to about 80×10-7/° C. In some embodiments, the glass has a density between about 2.34 gm/cc @ 20° C. and about 2.53 gm/cc @ 20° C. In some embodiments, the glass article is a light guide plate. In some embodiments, the thickness of the plate is between about 0.2 mm and about 8 mm. In some embodiments, the thickness has a variation of less than 5%. In some embodiments, the light guide plate is manufactured from a fusion draw process, slot draw process, or a float process. In some embodiments, the glass comprises less than 1 ppm each of Co, Ni, and Cr. In some embodiments, the concentration of Fe is <about 50 ppm, <about 20 ppm, or <about 10 ppm. In some embodiments, Fe+30Cr+35Ni <about 60 ppm, <about 40 ppm, <about 20 ppm, or <about 10 ppm. In some embodiments, the transmittance at 450 nm with at least 500 mm in length is greater than or equal to 85%, the transmittance at 550 nm with at least 500 mm in length is greater than or equal to 90%, or the transmittance at 630 nm with at least 500 mm in length is greater than or equal to 85%, and combinations thereof. In some embodiments, the glass is chemically strengthened. In further embodiments, the glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional embodiments, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

In additional embodiments, a glass article is provided comprising a glass having between about 60 mol % to about 80 mol % $SiO_2$, between about 0 mol % to about 15 mol % $Al_2O_3$, between about 0 mol % to about 15 mol % $B_2O_3$, and about 2 mol % to about 50 mol % $R_xO$, wherein R is any one or more of Li, Na, K, Rb, Cs and x is 2, or Zn, Mg, Ca, Sr or Ba and x is 1, and wherein Fe+30Cr+35Ni <about 60 ppm. In some embodiments, the glass has a color shift <0.008. In some embodiments, the glass has a color shift <0.005. In further embodiments, the glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional embodiments, the glass comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

In yet further embodiments, a glass article is provided comprising a glass having between about 60 mol % to about 80 mol % $SiO_2$, between about 0 mol % to about 15 mol % $Al_2O_3$, between about 0 mol % to about 15 mol % $B_2O_3$, and about 2 mol % to about 50 mol % $R_xO$, wherein R is any one or more of Li, Na, K, Rb, Cs and x is 2, or Zn, Mg, Ca, Sr or Ba and x is 1, and wherein the glass has a color shift <0.008. In some embodiments, the glass has a color shift <0.005. In further embodiments, the glass comprises from about 0.1 mol % to about 3.0 mol % ZnO, from about 0.1 mol % to about 1.0 mol % $TiO_2$, from about 0.1 mol % to about 1.0 mol % $V_2O_3$, from about 0.1 mol % to about 1.0 mol % $Nb_2O_5$, from about 0.1 mol % to about 1.0 mol % MnO, from about 0.1 mol % to about 1.0 mol % $ZrO_2$, from about 0.1 mol % to about 1.0 mol % $As_2O_3$, from about 0.1 mol % to about 1.0 mol % $SnO_2$, from about 0.1 mol % to about 1.0 mol % $MoO_3$, from about 0.1 mol % to about 1.0 mol % $Sb_2O_3$, or from about 0.1 mol % to about 1.0 mol % $CeO_2$. In additional embodiments, the glass comprises between 0.1 mol % to no more than about 3.0 mol % of one or combination of any of ZnO, TiO$_2$, V$_2$O$_3$, Nb$_2$O$_5$, MnO, ZrO$_2$, As$_2$O$_3$, SnO$_2$, MoO$_3$, Sb$_2$O$_3$, and CeO$_2$.

In other embodiments, a glass article is provided comprising a glass having between about 65.79 mol % to about 78.17 mol % SiO$_2$, between about 2.94 mol % to about 12.12 mol % Al$_2$O$_3$, between about 0 mol % to about 11.16 mol % B$_2$O$_3$, and about 3.52 mol % to about 42.39 mol % R$_x$O, wherein R is any one or more of Li, Na, K, Rb, Cs and x is 2, or Zn, Mg, Ca, Sr or Ba and x is 1, and wherein the glass has a color shift <0.008. In some embodiments, the glass has a color shift <0.005. In further embodiments, the glass comprises from about 0.1 mol % to about 3.0 mol % ZnO, from about 0.1 mol % to about 1.0 mol % TiO$_2$, from about 0.1 mol % to about 1.0 mol % V$_2$O$_3$, from about 0.1 mol % to about 1.0 mol % Nb$_2$O$_5$, from about 0.1 mol % to about 1.0 mol % MnO, from about 0.1 mol % to about 1.0 mol % ZrO$_2$, from about 0.1 mol % to about 1.0 mol % As$_2$O$_3$, from about 0.1 mol % to about 1.0 mol % SnO$_2$, from about 0.1 mol % to about 1.0 mol % MoO$_3$, from about 0.1 mol % to about 1.0 mol % Sb$_2$O$_3$, or from about 0.1 mol % to about 1.0 mol % CeO$_2$. In additional embodiments, the glass comprises between 0.1 mol % to no more than about 3.0 mol % of one or combination of any of ZnO, TiO$_2$, V$_2$O$_3$, Nb$_2$O$_5$, MnO, ZrO$_2$, As$_2$O$_3$, SnO$_2$, MoO$_3$, Sb$_2$O$_3$, and CeO$_2$.

In further embodiments, a glass article is provided comprising a glass having between about 60 mol % to about 81 mol % SiO$_2$, between about 0 mol % to about 2 mol % Al$_2$O$_3$, between about 0 mol % to about 15 mol % MgO, between about 0 mol % to about 2 mol % Li$_2$O, between about 9 mol % to about 15 mol % Na$_2$O, between about 0 mol % to about 1.5 mol % K$_2$O, between about 7 mol % to about 14 mol % CaO, between about 0 mol % to about 2 mol % SrO, and wherein Fe+30Cr+35Ni <about 60 ppm. In some embodiments, the glass has a color shift <0.008. In some embodiments, the glass has a color shift <0.005. In further embodiments, the glass comprises from about 0.1 mol % to about 3.0 mol % ZnO, from about 0.1 mol % to about 1.0 mol % TiO$_2$, from about 0.1 mol % to about 1.0 mol % V$_2$O$_3$, from about 0.1 mol % to about 1.0 mol % Nb$_2$O$_5$, from about 0.1 mol % to about 1.0 mol % MnO, from about 0.1 mol % to about 1.0 mol % ZrO$_2$, from about 0.1 mol % to about 1.0 mol % As$_2$O$_3$, from about 0.1 mol % to about 1.0 mol % SnO$_2$, from about 0.1 mol % to about 1.0 mol % MoO$_3$, from about 0.1 mol % to about 1.0 mol % Sb$_2$O$_3$, or from about 0.1 mol % to about 1.0 mol % CeO$_2$. In additional embodiments, the glass comprises between 0.1 mol % to no more than about 3.0 mol % of one or combination of any of ZnO, TiO$_2$, V$_2$O$_3$, Nb$_2$O$_5$, MnO, ZrO$_2$, As$_2$O$_3$, SnO$_2$, MoO$_3$, Sb$_2$O$_3$, and CeO$_2$.

In additional embodiments, a glass article is provided comprising a glass having between about 60 mol % to about 81 mol % SiO$_2$, between about 0 mol % to about 2 mol % Al$_2$O$_3$, between about 0 mol % to about 15 mol % MgO, between about 0 mol % to about 2 mol % Li$_2$O, between about 9 mol % to about 15 mol % Na$_2$O, between about 0 mol % to about 1.5 mol % K$_2$O, between about 7 mol % to about 14 mol % CaO, and between about 0 mol % to about 2 mol % SrO, wherein the glass has a color shift <0.008. In some embodiments, the glass has a color shift <0.005. In further embodiments, the glass comprises from about 0.1 mol % to about 3.0 mol % ZnO, from about 0.1 mol % to about 1.0 mol % TiO$_2$, from about 0.1 mol % to about 1.0 mol % V$_2$O$_3$, from about 0.1 mol % to about 1.0 mol % Nb$_2$O$_5$, from about 0.1 mol % to about 1.0 mol % MnO, from about 0.1 mol % to about 1.0 mol % ZrO$_2$, from about 0.1 mol % to about 1.0 mol % As$_2$O$_3$, from about 0.1 mol % to about 1.0 mol % SnO$_2$, from about 0.1 mol % to about 1.0 mol % MoO$_3$, from about 0.1 mol % to about 1.0 mol % Sb$_2$O$_3$, or from about 0.1 mol % to about 1.0 mol % CeO$_2$. In additional embodiments, the glass comprises between 0.1 mol % to no more than about 3.0 mol % of one or combination of any of ZnO, TiO$_2$, V$_2$O$_3$, Nb$_2$O$_5$, MnO, ZrO$_2$, As$_2$O$_3$, SnO$_2$, MoO$_3$, Sb$_2$O$_3$, and CeO$_2$.

Auto-Fluorescence Measurements

The auto-fluorescence of glasses having different compositions was determined using confocal microscopy. An excitation wavelength from a laser was directed at samples of each of the glasses and the fluorescence emitted from the glass samples was subsequently detected at wavelengths of 514 nm and 633 nm. A Zeiss 510LSM Confocal Microscope was utilized having a photomultiplier tube (PMT) and a cut off filter to prevent stray light from passing to the PMT. For each of the glass samples, the laser was operated at different power settings (25%, 50% and 100%), and a baseline measurement was taken without directing the laser at the glass samples in order to determine the background noise present in the measurement system and in the measurement environment. Table 6A shows the measurement results at a wavelength of 514 nm and Table 6B shows the measurement results at a wavelength of 633 nm. Sample A was a patterned glass flow cell (commercially available as HiSeq X Series Systems from Illumina, Inc., San Diego, Calif.) formed from a borosilicate glass (commercially available as D263®T from Schott AG, Mainz, Germany); Sample B was a non-patterned glass flow cell (commercially available as HiSeq 2500/HiSeq 3000/HiSeq 4000 Systems from Illumina, Inc., San Diego, Calif.) formed from D263®T borosilicate glass; Sample C was a glass slide formed from a borosilicate glass which was free of heavy metals (commercially available as Eagle XG from Corning, Inc., Corning, N.Y.); Sample D was a glass slide formed from high purity fused silica (commercially available as HPFS® Fused silica from Corning, Inc., Corning, N.Y.); and Sample E was a glass slide formed from glass compositions as described herein. In particularly, the glass of the slide of Sample E had between about 60 mol % to about 80 mol % SiO$_2$, between about 0 mol % to about 15 mol % Al$_2$O$_3$, between about 0 mol % to about 15 mol % B$_2$O$_3$, and between about 2 mol % to about 50 mol % R$_x$O, wherein R is any one or more of Li, Na, K, Rb, Cs and x is 2, or wherein R is any one or more of Zn, Mg, Ca, Sr or Ba and x is 1.

TABLE 6A

|      | A   | B   | C  | D  | E  |
|------|-----|-----|----|----|----|
| 0%   | 12  | 12  | 13 | 12 | 12 |
| 25%  | 42  | 56  | 32 | 32 | 33 |
| 50%  | 72  | 99  | 53 | 53 | 52 |
| 100% | 132 | 188 | 95 | 93 | 94 |

TABLE 6B

|      | A  | B  | C  | D  | E  |
|------|----|----|----|----|----|
| 0%   | 12 | 12 | 12 | 12 | 12 |
| 25%  | 29 | 25 | 18 | 18 | 18 |
| 50%  | 43 | 38 | 25 | 23 | 24 |
| 100% | 70 | 65 | 36 | 33 | 36 |

As indicated by the results presented in Tables 6A and 6B, the glass compositions as described herein have lower auto-fluorescence than glasses conventionally used as substrates for use in fluorescent-detection methods. More particularly, the glass compositions as described herein have lower auto-fluorescence than glasses which have been conventionally utilized in the fields of microbiology, cell culturing, tissue culturing, cell assays, IVF and DNA sequencing. For example, Sample A and Sample B included commercially available glass flow cells presently used in such fields. The results of Tables 6A and 6B also show that the glass compositions as described herein have similar auto-fluorescence the more expensive borosilicate glass free of heavy metals and the more expensive high purity fused silica.

According to an aspect (1) of the present disclosure, a substrate for use in fluorescent-detection methods is provided. The substrate comprises at least one glass substrate portion, the at least one glass substrate portion comprises: between about 60 mol % to about 80 mol % $SiO_2$, between about 0 mol % to about 15 mol % $Al_2O_3$, between about 0 mol % to about 15 mol % $B_2O_3$, and about 2 mol % to about 50 mol % $R_xO$, wherein R is any one or more of Li, Na, K, Rb, Cs and x is 2, or wherein R is any one or more of Zn, Mg, Ca, Sr or Ba and x is 1.

According to an aspect (2) of the present disclosure, the substrate of aspect (1) is provided, wherein the substrate comprises a microscope slide, a microarray, a flask, a capillary tube, a multiwell plate, a microfluidic channel, a microfluidic reservoir, or a petri dish.

According to an aspect (3) of the present disclosure, the substrate of aspect (1) is provided, wherein the substrate comprises a multiwell plate, and wherein the at least one glass substrate portion comprises a lower plate of the multiwell plate.

According to an aspect (4) of the present disclosure, the substrate of aspect (3) is provided, wherein the lower plate is substantially flat.

According to an aspect (5) of the present disclosure, the substrate of any of aspects (3)-(4) is provided, wherein the multiwell plate further comprises an upper portion comprising a peripheral skirt, a top surface and an array of open-ended wells.

According to an aspect (6) of the present disclosure, the substrate of aspect (1) is provided, wherein the substrate comprises a flow cell device comprising at least one layer, and wherein the at least one glass substrate portion comprises at least one of the at least one layer.

According to an aspect (7) of the present disclosure, the substrate of aspect (6) is provided, wherein the flow cell device comprises at least one flow channel in at least one of the at least one layer.

According to an aspect (8) of the present disclosure, the substrate of aspect (7) is provided, wherein the at least one flow channel is acid etched in at least one of the at least one layer.

According to an aspect (9) of the present disclosure, the substrate of any of aspects (6)-(8) is provided comprising at least two layers, wherein at least one of the at least two layers comprises a polymer material.

According to an aspect (10) of the present disclosure, the substrate of any of aspects (6)-(9) is provided comprising at least two layers and further comprising a bonding agent between at least two of the at least two layers.

According to an aspect (11) of the present disclosure, the substrate of aspect (10) is provided, wherein the bonding agent is selected from the group consisting of metal, metal oxide, glass, ceramic or plastic.

According to an aspect (12) of the present disclosure, the substrate of any of aspects (6)-(11) is provided, wherein the flow cell device comprises a base layer, a channel layer overlaying the base layer, and a cover layer.

According to an aspect (13) of the present disclosure, the substrate of aspect (12) is provided, wherein the at least one glass substrate portion comprises the base layer.

According to an aspect (14) of the present disclosure, the substrate of aspect (12) is provided, wherein the at least one glass substrate portion comprises the cover layer.

According to an aspect (15) of the present disclosure, the substrate of aspect (1) is provided, wherein the substrate comprises a petri dish, wherein the petri dish comprises a base having a flat bottom panel and a base sidewall extending substantially perpendicularly upward from the bottom panel, and wherein the at least one glass substrate portion comprises at least one of the bottom panel and the base sidewall.

According to an aspect (16) of the present disclosure, the substrate of any of aspects (1)-(15) is provided, wherein R is any one or more of Li, Na, K, Rb, Cs and x is 2, or Zn, Mg, Ca, Sr or Ba and x is 1, and wherein x=2 and $R_xO/Al_2O_3$ is between 0.95 and 3.23.

According to an aspect (17) of the present disclosure, the substrate of any of aspects (1)-(16) is provided, wherein R is any one or more of Li, Na, K, Rb, Cs and x is 2, or Zn, Mg, Ca, Sr or Ba and x is 1, and wherein $R_xO/Al_2O_3$ is between 1.18 and 5.68.

According to an aspect (18) of the present disclosure, the substrate of any of aspects (1)-(17) is provided, wherein R is any one or more of Li, Na, K, Rb, Cs and x is 2, or Zn, Mg, Ca, Sr or Ba and x is 1, and wherein x=2 and $R_xO—Al_2O_3—MgO$ is between −4.25 and 4.0.

According to an aspect (19) of the present disclosure, the substrate of aspect (1)-(18) is provided, wherein the at least one glass substrate portion comprises: between about 65.79 mol % to about 78.17 mol % $SiO_2$, between about 2.94 mol % to about 12.12 mol % $Al_2O_3$, between about 0 mol % to about 11.16 mol % $B_2O_3$, between about 0 mol % to about 2.06 mol % $Li_2O$, between about 3.52 mol % to about 13.25 mol % $Na_2O$, between about 0 mol % to about 4.83 mol % $K_2O$, between about 0 mol % to about 3.01 mol % ZnO, between about 0 mol % to about 8.72 mol % MgO, between about 0 mol % to about 4.24 mol % CaO, between about 0 mol % to about 6.17 mol % SrO, between about 0 mol % to about 4.3 mol % BaO, and between about 0.07 mol % to about 0.11 mol % $SnO_2$.

According to an aspect (20) of the present disclosure, the substrate of any of aspects (1)-(19) is provided, wherein the at least one glass substrate portion comprises between 0.1 mol % to no more than about 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

According to an aspect (21) of the present disclosure, the substrate of any of aspects (1)-(20) is provided, wherein the thickness has a variation of less than 5%.

According to an aspect (22) of the present disclosure, the substrate of any of aspects (1)-(21) is provided, wherein the at least one glass substrate portion comprises less than 1 ppm each of Co, Ni, and Cr.

According to an aspect (23) of the present disclosure, the substrate of any of aspects (1)-(22) is provided, wherein the at least one glass substrate portion comprises a concentration of Fe of less than about 50 ppm.

According to an aspect (24) of the present disclosure, the substrate of any of aspects (1)-(23) is provided, wherein the at least one glass substrate portion comprises Fe+30Cr+35Ni of less than about 60 ppm.

According to an aspect (25) of the present disclosure, the substrate of any of aspects (1)-(24) is provided, wherein the transmittance at 450 nm with at least 500 mm in length is greater than or equal to 85%, the transmittance at 550 nm with at least 500 mm in length is greater than or equal to 90%, or the transmittance at 630 nm with at least 500 mm in length is greater than or equal to 85%, and combinations thereof.

According to an aspect (26) of the present disclosure, the substrate of any of aspects (1)-(25) is provided, wherein the at least one glass substrate portion is chemically strengthened.

It will be appreciated that the various disclosed embodiments may involve particular features, elements or steps that are described in connection with that particular embodiment. It will also be appreciated that a particular feature, element or step, although described in relation to one particular embodiment, may be interchanged or combined with alternate embodiments in various non-illustrated combinations or permutations.

It is also to be understood that, as used herein the terms "the," "a," or "an," mean "at least one," and should not be limited to "only one" unless explicitly indicated to the contrary. Thus, for example, reference to "a ring" includes examples having two or more such rings unless the context clearly indicates otherwise. Likewise, a "plurality" or an "array" is intended to denote "more than one." As such, a "plurality of droplets" includes two or more such droplets, such as three or more such droplets, etc., and an "array of rings" comprises two or more such droplets, such as three or more such rings, etc.

Ranges can be expressed herein as from "about" one particular value, and/or to "about" another particular value. When such a range is expressed, examples include from the one particular value and/or to the other particular value. Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

The terms "substantial," "substantially," and variations thereof as used herein are intended to note that a described feature is equal or approximately equal to a value or description. For example, a "substantially planar" surface is intended to denote a surface that is planar or approximately planar. Moreover, as defined above, "substantially similar" is intended to denote that two values are equal or approximately equal. In some embodiments, "substantially similar" may denote values within about 10% of each other, such as within about 5% of each other, or within about 2% of each other.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a device that comprises A+B+C include embodiments where a device consists of A+B+C and embodiments where a device consists essentially of A+B+C.

It will be apparent to those skilled in the art that various modifications and variations can be made to the present disclosure without departing from the spirit and scope of the disclosure. Since modifications combinations, sub-combinations and variations of the disclosed embodiments incorporating the spirit and substance of the disclosure may occur to persons skilled in the art, the disclosure should be construed to include everything within the scope of the appended claims and their equivalents.

What is claimed is:

1. A substrate for use in fluorescent-detection methods, the substrate comprising at least one glass substrate portion, the at least one glass substrate portion having low autofluorescence and comprising:
    from 65.79 mol % to 78.17 mol % 60 mol,
    from 2.94 mol % to 12.12 mol %,
    from 0 mol % to 11.16 mol % $B_2O_3$,
    from 0 mol % to 2.06 mol % $Li_2O$,
    from 3.52 mol % to 13.25 mol % $Na_2O$,
    from 0 mol % to 4.83 mol % $K_2O$,
    from 0.1 mol % to 3.0 mol % ZnO,
    from 0 mol % to 8.72 mol % MgO,
    from 0 mol % to 4.24 mol % CaO,
    from 0 mol % to 6.17 mol % SrO,
    from 0 mol % to 4.3 mol % BaO,
    from 0.07 mol % to 0.11 mol % $SnO_2$,
    from 0.1 mol % to 3.0 mol % ZnO,
    at most 0.05 mol % $As_2O_3$, and
    at most 0.05 mol % $Sb_2O_3$,
    wherein $R_2O$—$Al_2O_3$—MgO is −4.25 to 4.0, wherein $R_2O$ is selected from $Li_2O$, $Na_2O$, $K_2O$, $Rb_2O$, and $Cs_2O$, and
    wherein a sum of glass substrate portion components does not exceed 100 mol %.

2. The substrate of claim 1, wherein the at least one glass substrate portion comprises from 0.1 mol % to no more than 3.0 mol % of one or combination of any of ZnO, $TiO_2$, $V_2O_3$, $Nb_2O_5$, MnO, $ZrO_2$, $As_2O_3$, $SnO_2$, $MoO_3$, $Sb_2O_3$, and $CeO_2$.

3. The substrate of claim 1, wherein the at least one glass substrate portion comprises less than 1 ppm each of Co, Ni, and Cr.

4. The substrate of claim 1, wherein the at least one glass substrate portion comprises a concentration of Fe of less than 50 ppm.

5. The substrate of claim 1, wherein the at least one glass substrate portion comprises Fe+30Cr+35Ni of less than 60 ppm.

6. The substrate of claim 1, wherein the transmittance at 450 nm with at least 500 mm in length is greater than or equal to 85%, the transmittance at 550 nm with at least 500 mm in length is greater than or equal to 90%, or the transmittance at 630 nm with at least 500 mm in length is greater than or equal to 85%, and combinations thereof.

7. The substrate of claim 1, wherein the thickness has a variation of less than 5%.

8. The substrate of claim 1, wherein the at least one glass substrate portion is chemically strengthened.

9. The substrate of claim 1, wherein the substrate comprises a microscope slide, a microarray, a flask, a capillary tube, a multiwell plate, a microfluidic channel, a microfluidic reservoir, a flow cell device, or a petri dish.

10. The substrate of claim 1, wherein the substrate comprises a petri dish and wherein the petri dish comprises a base having a flat bottom panel and a base sidewall extending substantially perpendicularly upward from the bottom panel, and wherein the at least one glass substrate portion comprises at least one of the bottom panel and the base sidewall.

11. The substrate of claim 1, wherein the substrate comprises a multiwell plate, and wherein the at least one glass substrate portion comprises a lower plate of the multiwell plate.

12. The substrate of claim 11, wherein the lower plate is substantially flat.

13. The substrate of claim 11, wherein the multiwell plate further comprises an upper portion comprising a peripheral skirt, a top surface and an array of open-ended wells.

14. The substrate of claim 1, wherein the substrate comprises a flow cell device comprising at least one layer, and wherein the at least one glass substrate portion comprises at least one of the at least one layer.

15. The substrate of claim 14, comprising at least two layers, wherein at least one of the at least two layers comprises a polymer material.

16. The substrate of claim 14, wherein the flow cell device comprises at least one flow channel in at least one of the at least one layer.

17. The substrate of claim 16, wherein the at least one flow channel is acid etched in at least one of the at least one layer.

18. The substrate of claim 14, comprising at least two layers and further comprising a bonding agent between at least two of the at least two layers.

19. The substrate of claim 18, wherein the bonding agent is selected from the group consisting of metal, metal oxide, glass, ceramic or plastic.

20. The substrate of claim 14, wherein the flow cell device comprises a base layer, a channel layer overlaying the base layer, and a cover layer.

21. The substrate of claim 20, wherein the at least one glass substrate portion comprises the base layer.

22. The substrate of claim 20, wherein the at least one glass substrate portion comprises the cover layer.

\* \* \* \* \*

UNITED STATES PATENT AND TRADEMARK OFFICE
CERTIFICATE OF CORRECTION

PATENT NO. : 11,186,516 B2
APPLICATION NO. : 15/769212
DATED : November 30, 2021
INVENTOR(S) : Melissann Marie Ashton-Patton et al.

Page 1 of 1

It is certified that error appears in the above-identified patent and that said Letters Patent is hereby corrected as shown below:

In the Claims

In Column 48, Line 17, In Claim 1, delete "60 mol," and insert -- $SiO_2$, --, therefor.

In Column 48, Line 18, In Claim 1, delete "mol %," and insert -- mol % $Al_2O_3$, --, therefor.

In Column 48, Lines 28-29, In Claim 1, above "at most 0.05 mol % $As_2O_3$, and" delete "from 0.1 mol % to 3.0 mol % ZnO,".

Signed and Sealed this
Seventh Day of January, 2025

Derrick Brent
*Acting Director of the United States Patent and Trademark Office*